United States Patent
Omelchenko et al.

(10) Patent No.: US 11,965,258 B1
(45) Date of Patent: Apr. 23, 2024

(54) SULFUR DIOXIDE DEPOLARIZED ELECTROLYSIS AND ELECTROLYZER THEREFORE

(71) Applicant: Peregrine Hydrogen Inc., Santa Cruz, CA (US)

(72) Inventors: Stefan Omelchenko, Santa Cruz, CA (US); Matthew Shaner, Santa Cruz, CA (US); Ian McKay, Santa Cruz, CA (US)

(73) Assignee: Peregrine Hydrogen Inc., Santa Cruz, CA (US)

( * ) Notice: Subject to any disclaimer, the term of this patent is extended or adjusted under 35 U.S.C. 154(b) by 0 days.

(21) Appl. No.: 18/376,312

(22) Filed: Oct. 3, 2023

Related U.S. Application Data

(60) Provisional application No. 63/378,203, filed on Oct. 3, 2022.

(51) Int. Cl.
| | |
|---|---|
| C25B 15/08 | (2006.01) |
| C01B 25/28 | (2006.01) |
| C01C 1/04 | (2006.01) |
| C01C 1/242 | (2006.01) |
| C22B 3/00 | (2006.01) |
| C22B 3/08 | (2006.01) |
| C22B 5/12 | (2006.01) |
| C22B 23/02 | (2006.01) |
| C25B 1/04 | (2021.01) |
| C25B 1/22 | (2006.01) |

(52) U.S. Cl.
CPC ............ *C25B 15/081* (2021.01); *C01B 25/28* (2013.01); *C01C 1/04* (2013.01); *C01C 1/242* (2013.01); *C22B 3/08* (2013.01); *C22B 5/12* (2013.01); *C22B 23/02* (2013.01); *C22B 23/043* (2013.01); *C25B 1/04* (2013.01); *C25B 1/22* (2013.01); *C25B 15/087* (2021.01)

(58) Field of Classification Search
CPC ....... C25B 15/081; C25B 1/22; C25B 15/087; C25B 1/04; C22B 23/043; C22B 5/12; C22B 3/08; C22B 23/02; C01C 1/04; C01C 1/242; C01B 25/28
See application file for complete search history.

(56) References Cited

U.S. PATENT DOCUMENTS

| | | |
|---|---|---|
| 2,273,795 A | 2/1942 | Heise et al. |
| 3,524,801 A | 8/1970 | Parsi |
| 3,888,750 A | 6/1975 | Brecher et al. |
| 4,191,619 A | 3/1980 | Struck |

(Continued)

FOREIGN PATENT DOCUMENTS

| | | | |
|---|---|---|---|
| WO | 2013191403 A1 | 12/2013 | |
| WO | WO 2021 118 599 A1 * | 6/2021 | ............. C01B 17/76 |

OTHER PUBLICATIONS

Abdel-Aal, Hussein K., "Novel Trends in Reforming Sour Natural Gas for Hydrogen & Synthesis Gas Production", JREAS, vol. 1, Issue 04, Oct. 2016.

(Continued)

*Primary Examiner* — Timothy C Vanoy
(74) *Attorney, Agent, or Firm* — Jeffrey Shox; Randy Mehlenbacher

(57) ABSTRACT

A method can include: processing precursors, electrochemically oxidizing sulfur dioxide, processing sulfuric acid and hydrogen, and/or any suitable steps.

20 Claims, 8 Drawing Sheets

(56) References Cited

U.S. PATENT DOCUMENTS

| | | | |
|---|---|---|---|
| 7,261,874 | B2 | 8/2007 | Lahoda et al. |
| 2006/0002845 | A1 | 1/2006 | Lahoda et al. |
| 2007/0007147 | A1 | 1/2007 | Lahoda |
| 2009/0045073 | A1 | 2/2009 | Stone et al. |
| 2013/0337366 | A1 | 12/2013 | Blanchet et al. |
| 2019/0177860 | A1 | 6/2019 | Tembhurne et al. |
| 2019/0376189 | A1 | 12/2019 | Tarabukin |
| 2020/0002822 | A1 | 1/2020 | Ono et al. |

OTHER PUBLICATIONS

Abdel-Aal, H.K., "Opportunities of Open-Loop Thermochemical Cycles: A Case Study", Int. J. Hydrogen Energy, vol. 9. No. 9, pp. 767-772, 1984.

Brecher, L.E., et al., "The Westinghouse Sulfur Cycle for the Thermochemical Decomposition of Water", International Journal of Hydrogen Energy, vol. 2, pp. 7-15. Pergamon Press. 1977. Printed in Northern Ireland.

Colón-Mercado, Hector R., et al., "Electrode optimization for efficient hydrogen production using an SO2-depolarized electrolysis cell", International Journal of Hydrogen Energy, vol. 47, Issue 31, Apr. 12, 2022, pp. 14180-14185.

Colón-Mercado, Hector R., et al., "High-performance SO2-depolarized electrolysis cell using advanced polymer electrolyte membranes", SRNL-STI-2021-00422, Journal ID: ISSN 0360-3199; TRN: U.S. Pat. No. 2,302,237, published Oct. 28, 2021.

Gorensek, M.B., et al., "Hybrid Sulfur Process Reference Design and Cost Analysis", SRNL-L1200-2008-00002, Rev 1, Report Date: Jun. 12, 2009, Prepared for the U.S. Department of Energy Under Contract No. DE-AC09-08SR22470.

Kyle, James Hamilton, "Nickel laterite processing technologies—where to next?", ALTA 2010 Nickel/Cobalt/Copper Conference, May 24-27, Perth, Western Australia.

Lu, P.W.T., et al., "Sulfur Dioxide Depolarized Electrolysis for Hydrogen Production: Development Status", Int. J. Hydrogen Energy, vol. 7, No. 7, pp. 563-575, 1982.

Muller, Hermann, et al., "Sulfur Dioxide", Ullmann's Encyclopedia of Industrial Chemistry, Chapter Sulfur Dioxide, Jun. 2000.

Sivasubramanian, Premkumar, et al., "Electrochemical hydrogen production from thermochemical cycles using a proton exchange membrane electrolyzer", 2006 International Association for Hydrogen Energy, available online Aug. 9, 2006.

Staser, John A., et al., "Sulfur Dioxide Crossover during the Production of Hydrogen and Sulfur Dioxide Crossover during the Production of Hydrogen and Sulfuric Acid in a PEM Electrolyzer Sulfuric Acid in a PEM Electrolyzer", Journal of the Electrochemical Society, 2009, pages B836-B841.

Steimke, John L., et al., "Development and testing of a PEM SO2-depolarized electrolyzer and an operating method that prevents sulfur accumulation", international Journal of Hydrogen Energy 40 (2015) 13281e13294.

Summers, W.A., et al., "Operation and Testing of an SO2-depolarized Electrolyzer (SDE) for the Purpose of Hydrogen and Sulfuric Acid Production", CRADA Final Report for CRADA No. CR-12-006, Sep. 2013 SRNL-STI-2013-00515, Prepared by Savannah River National Laboratory Aiken, South Carolina 29808 for the U.S. Department of Energy under contract No. DE-AC09-08SR22470.

McKay, Ian, et al., "System and Method for Production of Calcium Oxide with Reduced Carbon Footprint", U.S. Appl. No. 18/527,042, filed Dec. 1, 2023.

Chettiar, Maheshkumar, "Co-Production of Hydrogen and Sulfuric Acid by Electrolysis", Digital Commons, University of South Florida, USF Tampa Graduate Theses and Dissertations, Jun. 14, 2004.

Lokkiluoto, Anu, "Fundamentals of SO2 depolarized water electrolysis and challenges of materials used", Aalto University, Doctoral Dissertations, Apr. 5, 2013.

* cited by examiner

SULFUR DIOXIDE DEPOLARIZED ELECTROLYSIS AND ELECTROLYZER THEREFORE

CROSS-REFERENCE TO RELATED APPLICATIONS

This application claims the benefit of U.S. Provisional Application No. 63/378,203 filed 3 Oct. 2022, which is incorporated in its entirety by this reference.

TECHNICAL FIELD

This invention relates generally to the sulfur depolarized electrolysis field, and more specifically to a new and useful system and method in the sulfur depolarized electrolysis field.

DETAILED DESCRIPTION

The following description of the embodiments of the invention is not intended to limit the invention to these embodiments, but rather to enable any person skilled in the art to make and use this invention.

1. Overview

Figure 1:
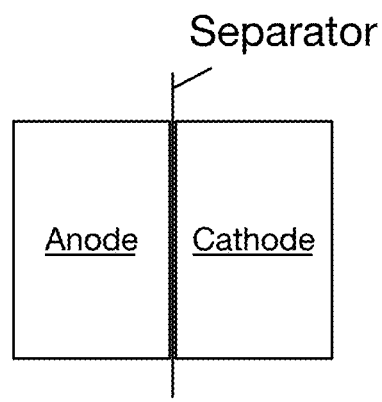
FIG. 1 is a schematic representation of an example of an electrolyzer.

As shown in FIG. 1, an electrolyzer 10 can include an anode 100, a cathode 200, and a separator 300. The anode can include an anolyte 110, an electrode 120, an anolyte reaction region 130, and/or any suitable components. The cathode can include a catholyte 210, an electrode 220, a catholyte reaction region 230, and/or any suitable components. However, the electrolyzer can include any suitable components.

Figure 2:
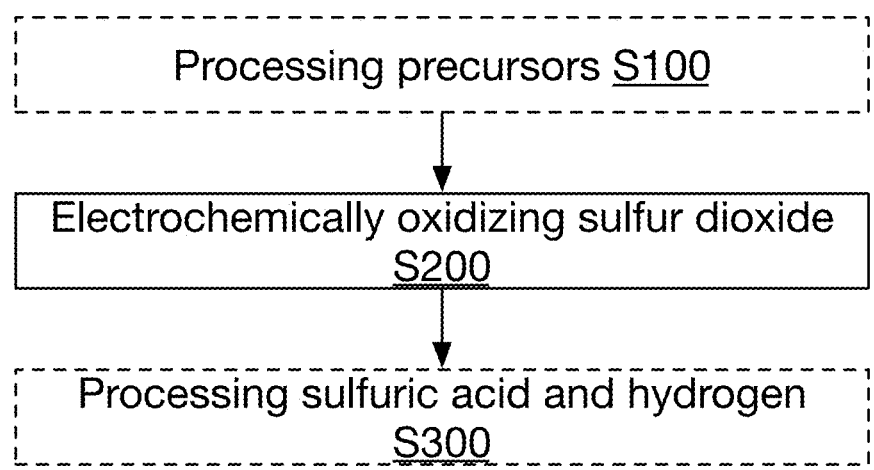
FIG. 2 is a schematic representation of an example of a method for electrolysis of sulfur dioxide and water.
Figure 3:
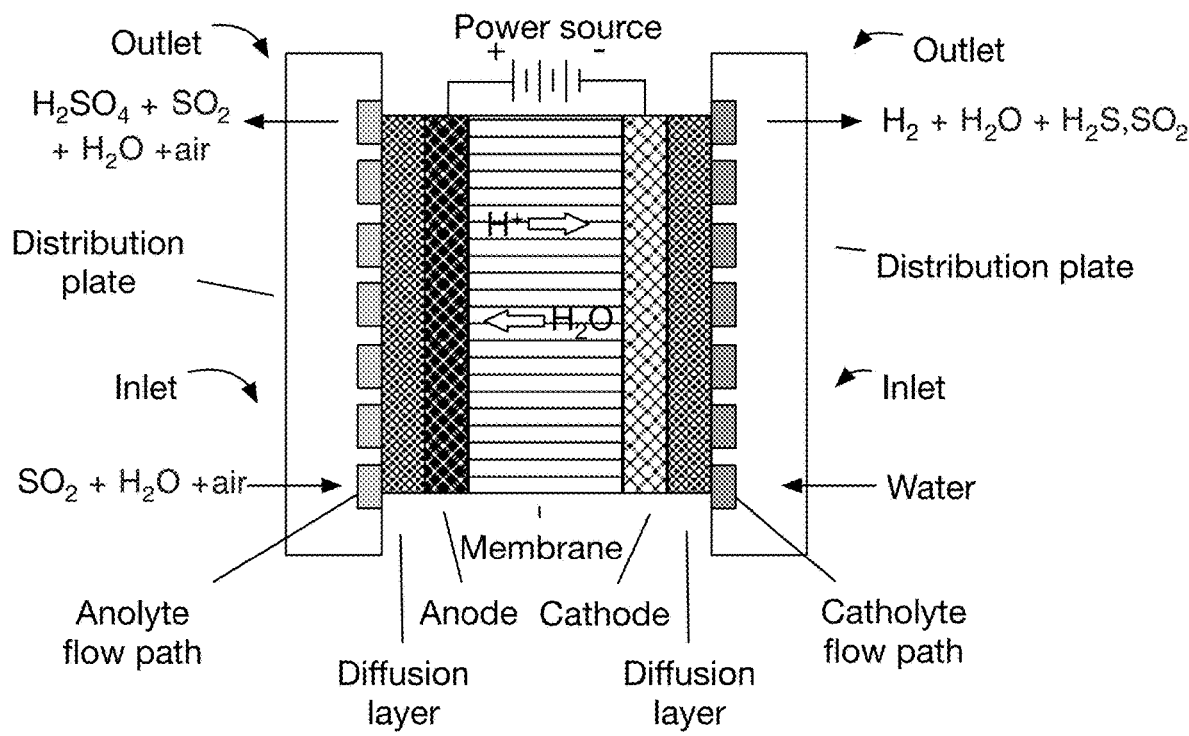
FIGS. 3, 4, and 5 are schematic representations of variants of sulfur dioxide depolarized electrolyzer cell.
Figure 4:
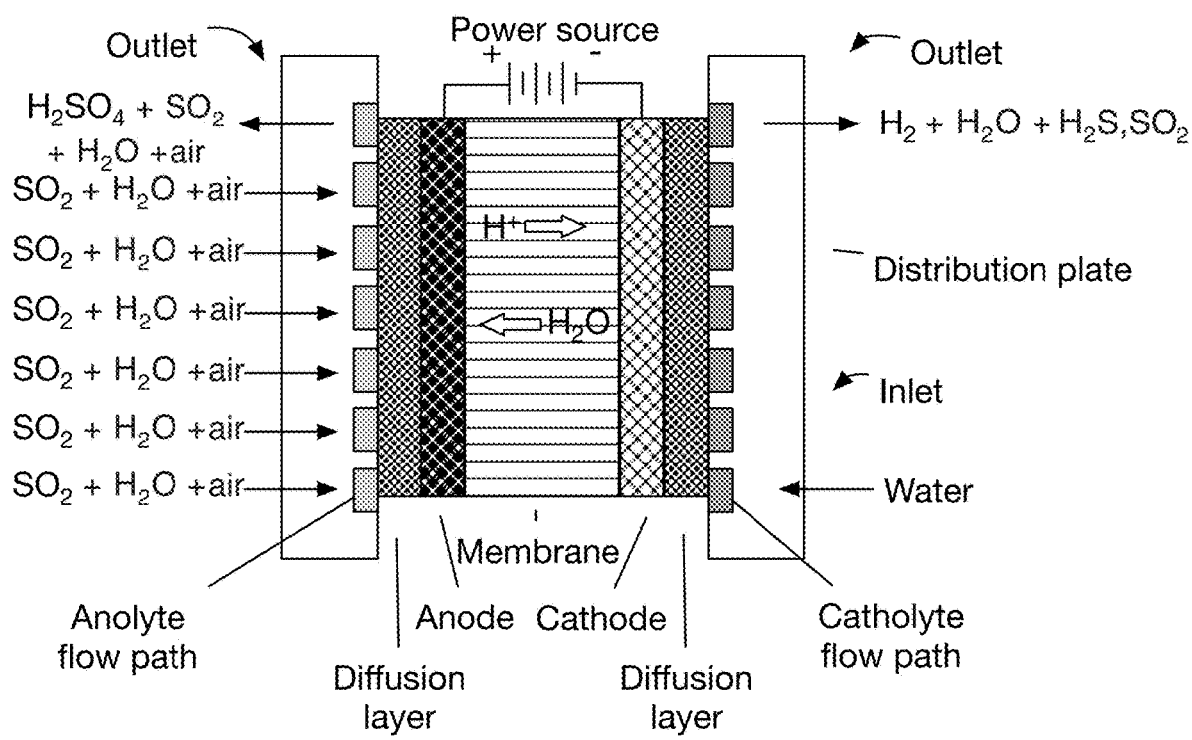
Figure 5:
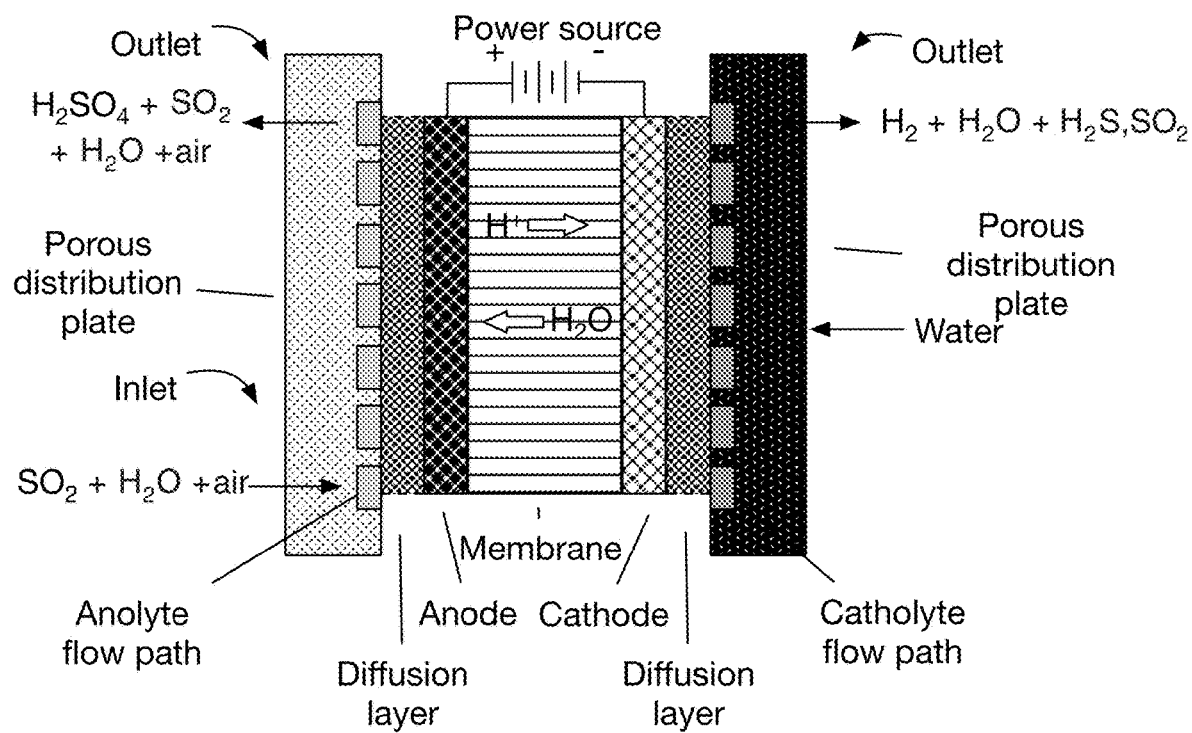
Figure 6A:
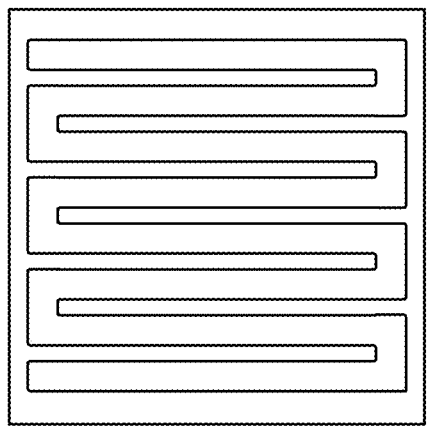
FIGS. 6A-6F are schematic representations of variants of anolyte and/or catholyte flow paths within a sulfur dioxide depolarized electrolyzer cell.
Figure 6B:
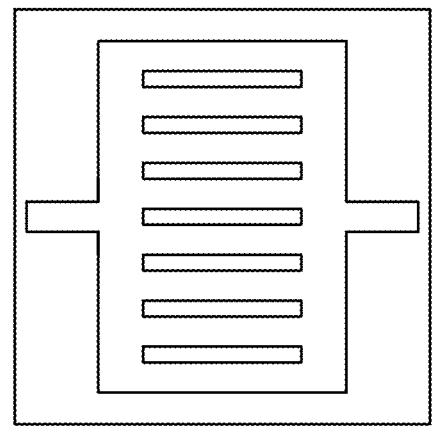
Figure 6C:
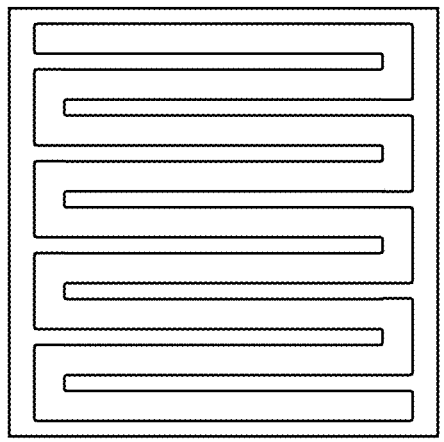
Figure 6D:
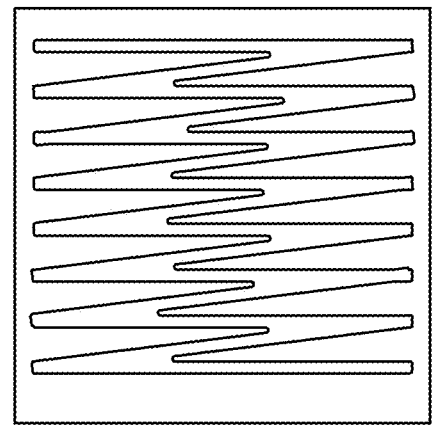
Figure 6E:
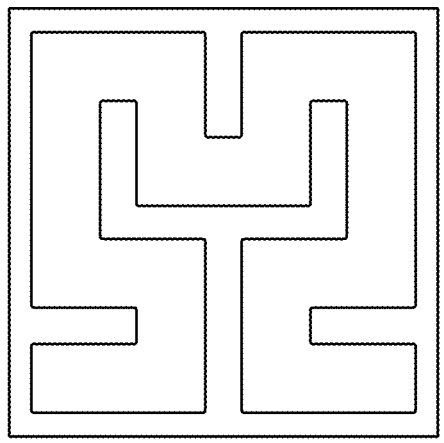
Figure 6F:
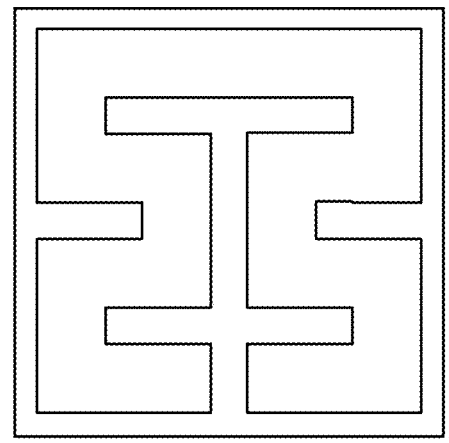
Figure 7:
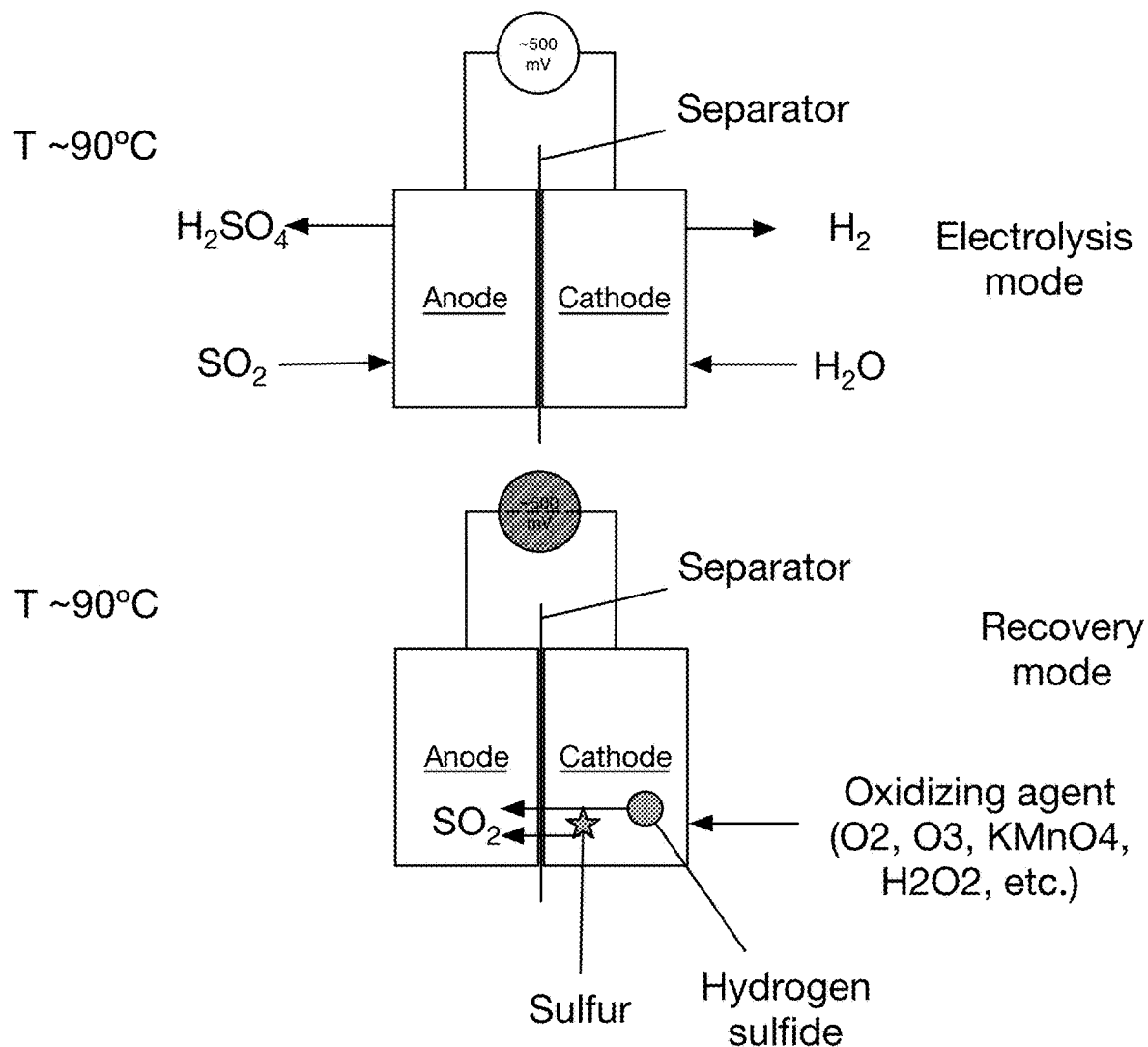
FIG. 7 is a schematic representation of an example of operating a sulfur dioxide depolarized electrolyzer in an electrolysis mode and a recovery mode.
Figure 8:
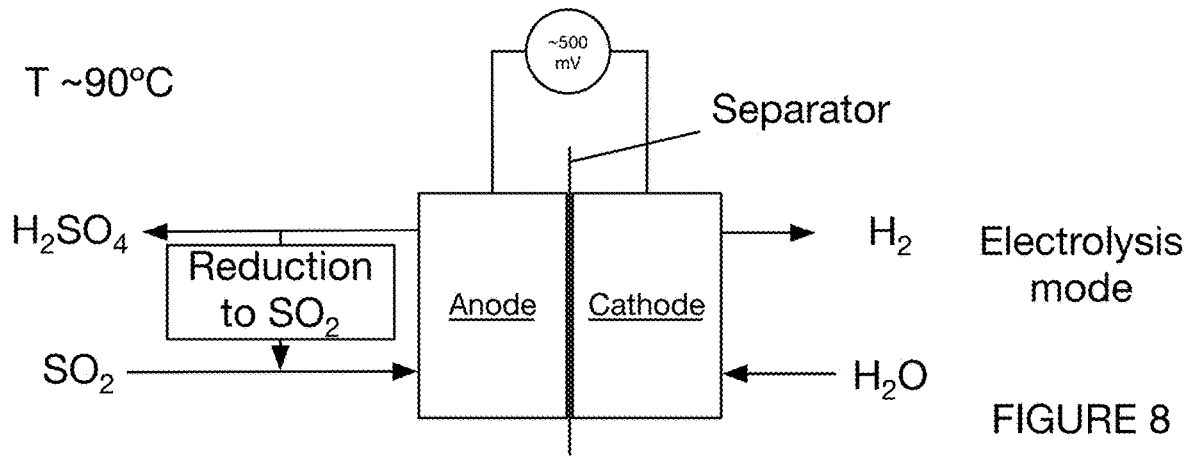
FIG. 8 is a schematic representation of an example of a sulfur dioxide depolarized electrolyzer operating with sulfuric acid being reduced to sulfur dioxide for reintroduction into the anode.

As shown for example in FIG. 2, a method can include: processing precursors S100, electrochemically oxidizing sulfur dioxide S200, processing sulfuric acid and hydrogen S300, and/or any suitable steps.

Figure 9:
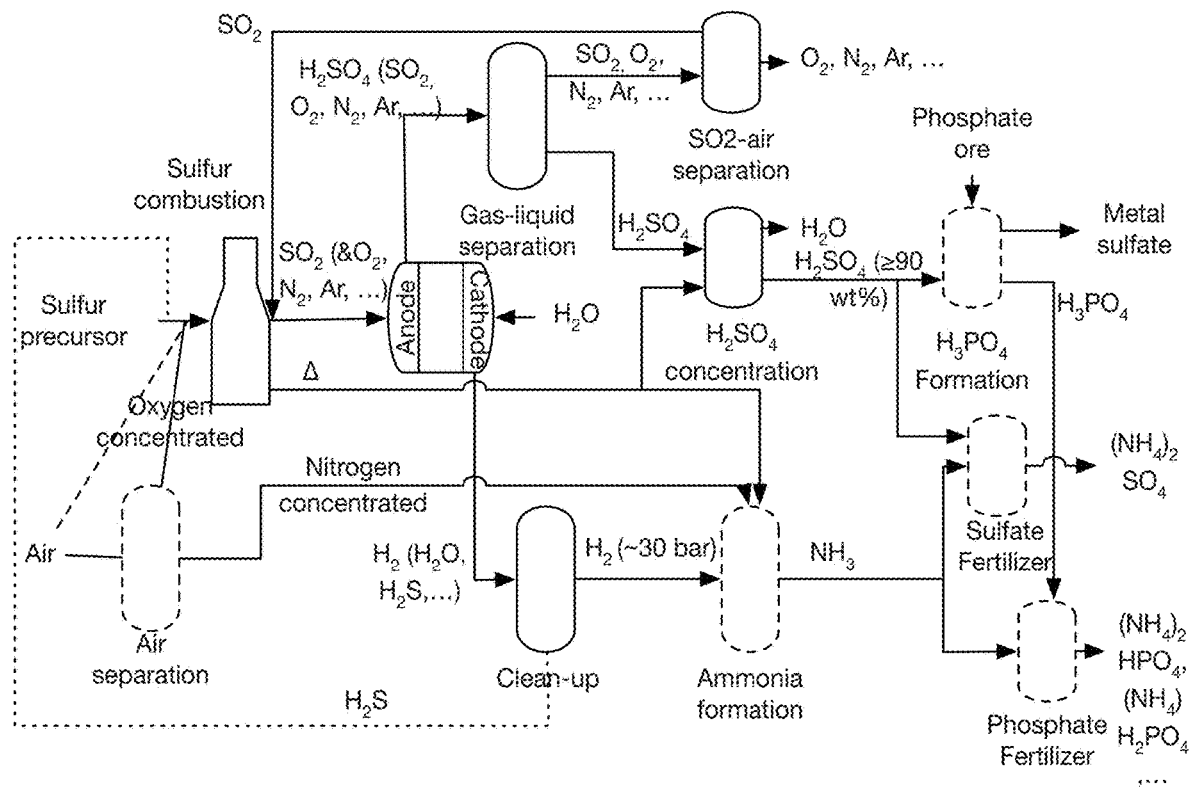
FIG. 9 is a schematic representation of an example of a method of integrating a sulfur dioxide depolarized electrolyzer with fertilizer (e.g., ammonium phosphate, ammonium sulfate, etc.) production.
Figure 10:
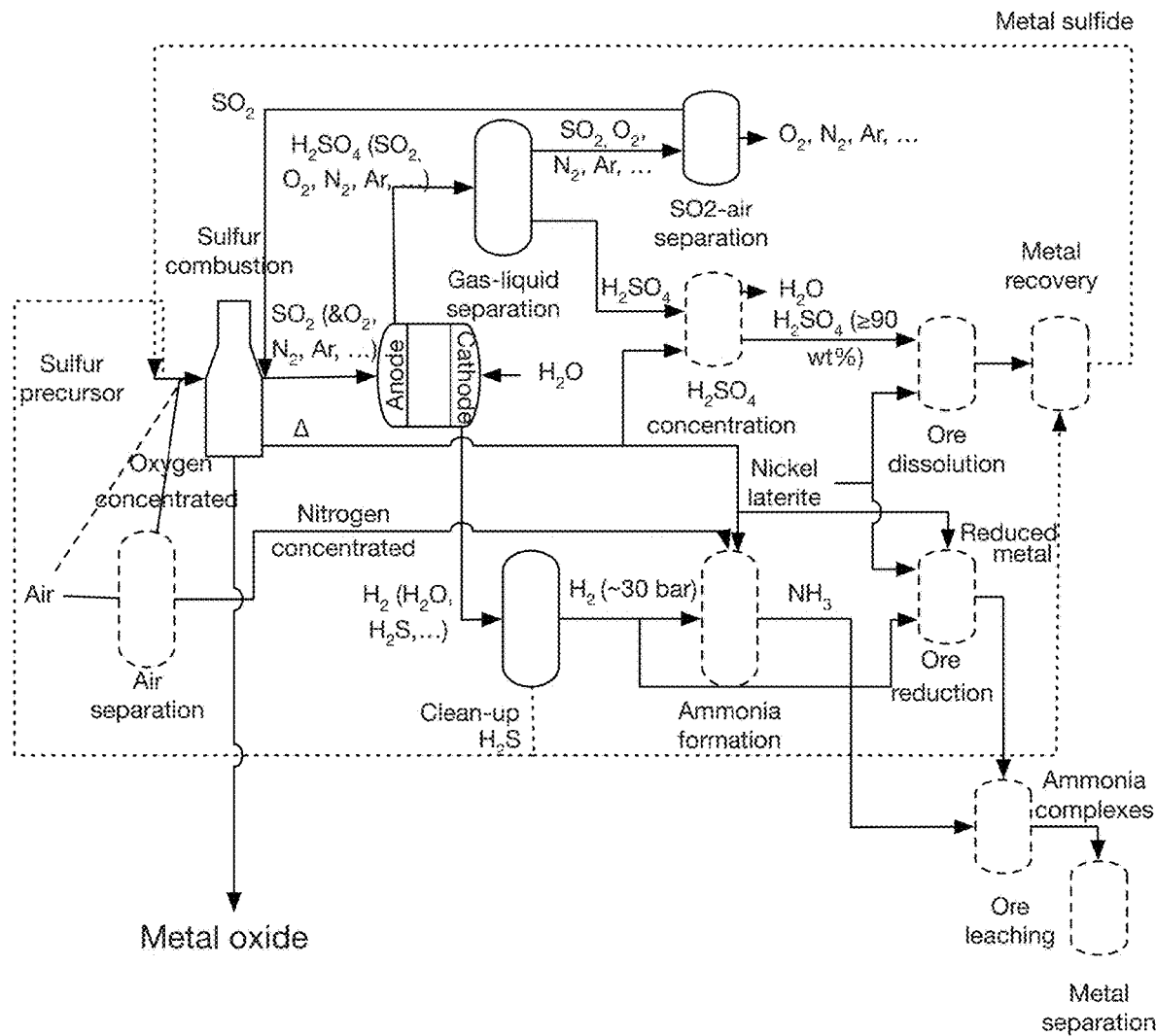
FIG. 10 is a schematic representation of an example of a method of integrating a sulfur dioxide depolarized electrolyzer with nickel laterite mining (e.g., to recover nickel, to separate nickel from concomitant metals such as iron or magnesium, etc.).

Embodiments of the system and/or method preferably facilitate and/or leverage the electrochemical oxidation of sulfur dioxide to sulfuric acid and electrochemical reduction of water (e.g., protons) to hydrogen. Preferably, the sulfuric acid and hydrogen are concomitantly used for one or more applications (and/or process steps within the application). Examples of applications include: chemical manufacturing, pharmaceutical manufacturing, ore refining, oil refining, ore extractions (e.g., recovery of nickel from nickel laterite ore), fertilizer production (e.g., to form ammonium sulfates, ammonium phosphates, etc.), metal processing, paper and pulp, automotive (e.g., for lead batteries, fuel cells, etc.), and/or any suitable applications can be performed using the sulfuric acid and/or hydrogen. However, the sulfuric acid and hydrogen can be used for separate applications (e.g., within a common plant, within different manufacturing facilities, etc.). As a first illustrative example (as shown for instance in FIG. 9), sulfuric acid can be used to generate phosphoric acid (e.g., from phosphate ores) and hydrogen can be used to generate ammonia (e.g., from $N_2$ such as according to a Haber-Bosch process), where the ammonia and phosphoric acid can be used to make a phosphate fertilizer (or alternatively sulfuric acid can be used to make sulfate fertilizer). As a second illustrative example (as shown for instance in FIG. 10), sulfuric acid and hydrogen can be used to extract nickel metal (e.g., for use in lithium batteries, for high performance alloy formation, corrosion resistant alloy formation, electronic alloy formation, heat resistance alloy formation, etc.) from nickel ores (e.g., nickel laterite ore) such as to separate nickel from iron, cobalt, and/or other metallic elements present in the ore (and/or to separate each metal from one another) and/or to reduce nickel oxide to nickel metal.

2. Technical Advantages

Variants of the technology can confer one or more advantages over conventional technologies.

First, the inventors have discovered that sulfur dioxide depolarized electrolyzer can be leveraged for coproduction of a sulfuric acid and hydrogen. Traditional applications of a sulfur dioxide depolarizer electrolyzer use the sulfuric acid cyclically (e.g., reducing the sulfuric acid to sulfur dioxide to provide back into the anode). In contrast, the inventors have found that in many applications sulfuric acid and hydrogen can be simultaneously leveraged as commodity chemicals and thereby generate positive value.

Second, as compared to water electrolysis, variants of the sulfur dioxide depolarized electrolyzer can operate at lower electrical potential (e.g., about 0.17 V as compared to the approximately 1.2V required for water electrolysis). As less electricity is required, these variants can reduce an environmental impact of hydrogen production as compared to water electrolysis. In related variants, the sulfur dioxide depolarized electrolyzer can reduce the relative cost of hydrogen production as coproduced sulfuric acid is a valuable product (whereas the coproduced oxygen in a water electrolyzer is less valuable) and/or by reducing the amount of electricity required.

Third, variants of the sulfur dioxide depolarized electrolyzer can reduce (e.g., minimize, mitigate, avoid, prevent, hinder, etc.) an amount of sulfur dioxide that crosses over a membrane separating the anode and the cathode of the electrolyzer, which can be beneficial for decreasing a risk of cathode poisoning (e.g., resulting from formation of sulfur and/or hydrogen sulfide in the cathode that can occupy reaction sites of the catalyst), decreasing byproduct formation (e.g., $H_2S$ formation), and/or can otherwise be beneficial. Variants of the sulfur depolarized electrolyzer can reduce the amount of the sulfur dioxide crossover by having a high $SO_2$ conversion efficiency (e.g., by having a large loading of catalyst throughout the anolyte reaction region), by leveraging a dead-ended (e.g., with anolyte entering the anolyte reaction region at a plurality of locations, everywhere, etc.) anolyte reaction region (rather than a flow through anolyte flow path with a single inlet), by having a high reduced catholyte back pressure (e.g., pressure of $H_2$ that exceeds an input pressure of $SO_2$ such as 10 bar, 15 bar, 20 bar, 25 bar, 30 bar, etc.), and/or can otherwise be achieved.

Fourth, variants of the sulfur depolarized electrolyzer can improve control over (e.g., to maximize, increase, etc.) sulfuric acid concentration, which can be beneficial for improving a cell lifetime, ensuring efficient cell operation, improving cell uptime (e.g., minimizing time spent in a recovery mode), reducing a need for or extent of sulfuric acid concentrating, and/or can otherwise be beneficial. Variants of the sulfur depolarized electrolyzer can improve control over sulfuric acid concentration by delivering catholyte (e.g., water) using a porous flow plate, improving uniformity of water through the distribution plate, controlling an amount of water added to the electrolyzer through the anolyte inlet (e.g., a relative humidity of the $SO_2$), based on the separator (e.g., membrane) used, and/or can otherwise be controlled.

Fifth, variants of the sulfur depolarized electrolyzer can help control (e.g., minimize, optimize, modify, etc.) a catalytic overpotential used during operation of the electrolyzer for water hydrolysis. Based on standard electrical potentials, a sulfur depolarized electrolyzer should operate with a potential of approximately 0.17 V; however, often voltages exceeding 500 mV are applied. Variants of the electrolyzer can control the overpotential by leveraging a recovery mode (e.g., to remove species poisoning the catalyst, to remove insolating species deposited on the catalyst, to free active spots on the catalyst, etc.), changing an anolyte and/or catholyte composition (e.g., introduction of additives, controlled water content, etc.), designing a catalyst for operation at a lower potential (e.g., catalyst material, catalyst morphology, catalyst location, etc.), controlling an electrolyzer operation temperature (e.g., operating at a higher temperature is generally correlated with lower potential but may result in reduced performance resulting from membrane dehydration reducing electrical and/or ionic conductivity), and/or in any manner.

Sixth, the inventors have discovered that a sulfur depolarized electrolyzer can enable multiple integrations into a single application. For instance, a sulfur depolarized electrolyzer can generate (e.g., coproduce) sulfuric acid with hydrogen. Some applications (e.g., chemical manufacturing, pharmaceutical manufacturing, fertilizer production, mining, metal recovery from ores such as nickel laterite, etc.) are more efficient when performed using and/or require both sulfuric acid and hydrogen, thus coproduction of sulfuric acid and hydrogen can be highly valuable. Moreover, some variants of the depolarizer electrolyzer can further leverage the integration between processing steps performed at a shared location by using heat, electricity, pressure, and/or other nonchemical outputs generated during processes in subsequent processes. Relatedly, the coproduction can also be beneficial for enabling recycling of chemical species (e.g., byproducts, unreacted species, etc.) thereby enhancing an efficiency of the process (e.g., total conversion efficiency from $SO_2$ to $H_2SO_4$, single pass conversion efficiency, etc.).

However, further advantages can be provided by the system and method disclosed herein.

3. Sulfur Depolarized Electrolyzer

As shown in FIG. 1, an electrolyzer 10 can include an anode 100, a cathode 200, and a separator 300. The anode can include an anolyte 110, an electrode 120, an anolyte reaction region 130, an anolyte inlet 132, an anode distribution plate 135 (e.g., defining the anolyte reaction region), an (oxidized) anolyte outlet 138, a diffusion layer 140, and/or any suitable components. The cathode can include a catholyte 210, an electrode 220, a catholyte reaction region 230, a catholyte inlet 232, a cathode distribution plate 235 (e.g., defining the catholyte reaction region), a (reduced) catholyte outlet 238, a diffusion layer 240, and/or any suitable components. However, the electrolyzer can include any suitable components.

The electrolyzer preferably functions to oxidize sulfur dioxide to sulfuric acid (and/or sulfur trioxide) with concurrent reduction of protons (e.g., $H^+$, from water, hydronium, etc.). However, the electrolyzer can additionally or alternatively function (e.g., using one or more alternative anolytes).

The electrolyzer can be a unicell electrolyzer and/or a multicell electrolyzer (e.g., with a plurality of cells in parallel).

The electrolyzer cell (e.g., components thereof such as distribution plates, total spatial extent of anolyte or catholyte flow paths, membrane, electrodes, anode, cathode, diffusion layer, etc.) can have a spatial extent between about 10 $cm^2$ and 1 $m^2$ (e.g., 25 $cm^2$, 50 $cm^2$, 100 $cm^2$, 250 $cm^2$, 500 $cm^2$, 1000 $cm^2$, 2500 $cm^2$, 5000 $cm^2$, 10 $dm^2$, 25 $dm^2$, 50 $dm^2$, 100 $dm^2$, 250 $dm^2$, 500 $dm^2$, 1000 $dm^2$, values or ranges therebetween, etc.). However, the spatial extent can be less than 10 $cm^2$ or greater than 1 $m^2$.

The anode preferably functions to oxidize an anolyte. The anolyte 110 is preferably sulfur dioxide. However, other suitable anolytes may be realized (e.g., $SO_x$). The anolyte can be provided in the gas phase (e.g., gaseous $SO_2$), liquid phase (e.g., condensed $SO_2$, $SO_2$ dissolved in water, $SO_2$ dissolved in sulfuric acid, $SO_2$ dissolved in sulfurous acid, etc.), and/or in any suitable phase (e.g., dissolved in a solvent). In variants where the anolyte is provided in the gas phase, the anolyte can optionally include one or more carrier gases (e.g., inert gases such as inert to electrolysis like nitrogen, oxygen, argon, air, carbon dioxide, neon, methane, krypton, etc.). For instance, the anolyte composition can range from pure sulfur dioxide gas (e.g., 100% $SO_2$) to about 10% $SO_2$ (by mass, by volume, by stoichiometry) with the remainder carrier gas. In some variants, the anolyte (and/or oxidized anolyte) can impart or improve an electrical conductivity to a solvent the anolyte is dissolved in (e.g., a solvent provided with the anolyte, a solvent from the catholyte, etc.). In some variants, the anolytes can be hydrated (e.g., a gas of the anolytes can be provided with water vapor), which can provide a technical advantage of enabling control of a concentration of sulfuric acid resulting from the oxidation of sulfur dioxide. For instance, a relative humidity (e.g., the amount of atmospheric water present relative to the amount of atmospheric water that would be present if the atmosphere were saturated with water such as at the inlet, at the electrolyzer operation temperature, etc.) of the anolyte can be between about 10% and 100% (e.g., 20%, 25%, 30%, 33%, 40%, 50%, 55%, 60%, 70%, 75%, 80%, 90%, 95%, values or ranges therebetween, etc.). However, any suitable anolyte(s) can be used.

The distribution plate (e.g., bipolar plates, flow field plate, etc.) can be made from (e.g., include) carbon material(s) (e.g., graphite; composite such as polymer matrix including thermoset resins like epoxy resin, phenolic resin, furan resin, vinyl ester, etc.; thermoplastic resin such as polypropylene, polyethylene, poly(vinylidene fluoride), etc.; etc. with a filler such as graphite powder, graphite flake, exfoliated graphite, coke-graphite, carbon nanotubes, carbon fiber, cellulose fiber, cotton flock, etc.; etc.), metal-composite (e.g., layered graphite, polycarbonate plastic, and stainless steel), metallic plates (e.g., stainless steel, aluminium, titanium, nickel, etc. optionally including a coating such as metal carbide, metal nitride, noble metal, metal oxide, catalyst, graphite, conductive polymer, etc.), and/or using any suitable material. The distribution plate can be solid (e.g., with cutouts, trenches, etc. defining an anolyte flow path; with structures protruding from a broad face of the distribution plate defining an anolyte flow path; etc. and through-holes defining inlets and/or outlets), porous (e.g., with a region analogous to the anolyte flow path where the anolyte primarily undergoes oxidation, where the distribution plate can act as a diffusion layer, etc.), and/or can have any suitable structure.

The diffusion layer can function to allow fluids (e.g., gases, liquids, solutes dissolved in the fluid, etc.) to diffuse to an electrode or catalyst layer (e.g., where the anolyte or species thereof can undergo oxidation). The diffusion layer can be made from porous carbon paper, carbon cloth, graphitized carbon paper, and/or can be made from any suitable material(s). The diffusion layer is typically between about 100-1000 μm thick. However, the diffusion layer can be thicker than 1000 μm or thinner than 100 μm.

The anode electrode 120 can include (e.g., be made from): platinum, gold, graphite, palladium, ruthenium, rhenium, iridium, rhodium, nickel, iron, combinations thereof (e.g., platinum-gold alloys), and/or any suitable electrode material can be used. In some variants, the anode electrode can be coated with the electrode material (e.g., where the coating material can act as a catalyst, protectant, etc.) and/or a catalyst material. Examples of catalyst materials include metal oxides (e.g., ruthenium oxide, palladium oxide, iridium oxide, titanium oxide, nickel oxide, iron oxide, etc.), nanoparticles (e.g., of an electrode material), carbon-based materials (e.g., carbon nanotubes, graphene, graphite, etc.), metal-organic frameworks (e.g., MOFs), polymer(s), alloys (e.g., Pt/C, PtRu/c, PtCo/C, etc.), combinations thereof, and/or any suitable materials. A catalyst loading is preferably between about 0.01 mg/cm$^2$ and 10 mg/cm$^2$. However, the catalyst loading can be less than 0.01 mg/cm$^2$ or greater than 10 mg/cm$^2$.

The anode catalyst preferably has a high specific surface area (e.g., a specific surface area greater than about 10 m$^2$/g, 15 m$^2$/g, 20 m$^2$/g, 25 m$^2$/g, 50 m$^2$/g, 75 m$^2$/g, 100 m$^2$/g, 150 m$^2$/g, 200 m$^2$/g, 250 m$^2$/g, 500 m$^2$/g, 1000 m$^2$/g, etc.). However, the anode catalyst can have a low specific surface area (e.g., <10 m$^2$/g), different specific surface area for different surfaces it is disposed on (e.g., a high specific surface area on an electrode and a low specific surface area on walls or surfaces defining the anolyte reaction region, a low specific surface area on an electrode and a high specific surface area on walls or surfaces defining the anolyte reaction region, a higher specific surface area on an electrode than on walls or surfaces defining the anolyte reaction region, a lower specific surface area on an electrode than on walls or surfaces defining the anolyte reaction region, etc.), and/or can have any suitable specific surface area.

The catalyst can form a coating (e.g., conformal coating, bumpy coating, porous coating, etc.), can include particles (e.g., nanoparticles such as nanospheres, nanorods, nanotubes, nanostars, nanoshells, nanopolyhedra, etc.; mesoparticles; microparticles; etc. such as hollow particles, porous particles, solid particles, etc.) that can be deposited on a surface, and/or can have any suitable structure (e.g., engineered structure).

In some variants, catalyst can be disposed on (e.g., deposited on) surfaces of the anolyte reaction region (e.g., in addition to or as an alternative to coating or being the electrode). For instance, the distribution plate 135 can be made of the catalyst, the distribution plate can include structures made from the catalyst the define the anolyte reaction region, walls or surfaces defining the anolyte reaction region 130 can include catalyst, and/or the catalyst can otherwise be disposed on surfaces of the anolyte reaction region.

The anolyte reaction region (e.g., anolyte flow path) can be a straight pass through (e.g., parallel to the electrode, perpendicular to the electrode, intersecting the electrode at an angle, etc.) and/or can have a tortuous path (e.g., crossing over the electrode at a plurality of locations). Examples of tortuous paths include serpentine paths, raster paths (e.g., as shown for example in FIG. 6D), boustrophedonic paths (e.g., as shown for example in FIG. 6A or FIG. 6C), space-filling paths (e.g., Peano curve, fractal path, Hilbert curve, Moore curve, as shown for example in FIG. 6E or FIG. 6F, etc.), split or parallel paths (e.g., as shown for example in FIG. 6B), and/or any suitable paths can be followed. The anolyte inlet 132 to the anolyte reaction region can be on the same side, an opposing side, an orthogonal side, and/or have any suitable arrangement to an anolyte outlet 138 (examples as shown in FIG. 6A-6F).

In some variants, the anolyte inlet can include a plurality of inlets, which can be beneficial for avoiding (e.g., decreasing, minimizing, etc.) an amount of $SO_2$ crossover (e.g., the transfer of $SO_2$ across the membrane, occurrence of $SO_2$ in the catholyte flow path, etc.). As a first example, a plurality of (e.g., each) turn or curve in the anolyte reaction region can include an inlet. As a second example, the distribution plate (or portions thereof containing, adjacent to, etc. the anolyte reaction region) can be porous or gas permeable to enable $SO_2$ to enter the anolyte reaction region (e.g., anolyte channel, anolyte reaction region, etc.) from any location. However, the plurality of anolyte inlets can be arranged in any manner.

The cathode preferably functions to reduce a catholyte species. The catholyte is typically protons (usually provided as hydronium ions, dissolved in water, etc.) resulting in a reduced catholyte species of hydrogen ($H_2$) or isotopes thereof. The catholytes are typically provided dissolved in a solvent (e.g., water). However, the catholytes can be provided in gas phase, liquid phase, and/or in any suitable phase (e.g., plasma). In some variants, the catholyte can crossover the membrane (e.g., separator) and into the anolyte reaction region. Variants that use a gaseous catholyte (e.g., hydrated carrier gas; carrier gas with relative humidity greater than about 50%, 60%, 70%, 80%, 90%, 95%, 100%, etc.; etc.) can provide a technical advantage of reducing, hindering, preventing, and/or otherwise mitigating formation of bubbles within the catholyte reaction region (where bubble formation can reduce an efficiency of the electrolyzer by increasing resistance, reducing available catalyst reaction sites, etc.) and/or can provide and/or improve control of the sulfuric acid concentration.

The distribution plate (e.g., bipolar plates, flow field plate, etc.) can be the same as and/or different from the anode distribution plate. For instance, the distribution plate can be made in the same manner as, from the same material as, have the same dimensions as, a catholyte reaction region (or catholyte flow path) that is the same as (e.g., mirror image of, has the same structure as, etc.) the anolyte reaction region (or anolyte flow path), and/or can otherwise have any suitable distribution plate as described for an anode distribution plate.

The cathode diffusion layer can be any suitable anode diffusion layer (e.g., as described above). The cathode diffusion layer can be the same as and/or different from the anode diffusion layer.

The cathode electrode 220 can include (e.g., be made from): platinum, gold, carbon (e.g., graphite, carbon black, etc.), palladium, ruthenium, rhenium, iridium, rhodium, nickel, iron, titanium, combinations thereof (e.g., platinum-gold alloys), and/or any suitable electrode material can be used. In some variants, the cathode electrode (e.g., a substrate, support layer, etc. preferably with high electrical conductivity) can be coated with the electrode material (e.g., where the coating material can act as a catalyst, protectant, etc.) and/or a catalyst material (e.g., electrocatalyst). Examples of catalyst materials include metal oxides (e.g., ruthenium oxide, palladium oxide, iridium oxide, titanium oxide, nickel oxide, iron oxide, etc.), nanoparticles (e.g., of an electrode material), carbon-based materials (e.g., carbon nanotubes, graphene, graphite, etc.), metal-organic frameworks (e.g., MOFs), polymer(s), alloys (e.g., Pt/C, PtRu/c, PtCo/C, etc.), combinations thereof, and/or any suitable materials. A catalyst loading is preferably between about 0.01 mg/cm$^2$ and 10 mg/cm$^2$. However, the catalyst loading can be less than 0.01 mg/cm$^2$ or greater than 10 mg/cm$^2$.

The cathode catalyst preferably has a high specific surface area (e.g., a specific surface area greater than about 10 m$^2$/g, 15 m$^2$/g, 20 m$^2$/g, 25 m$^2$/g, 50 m$^2$/g, 75 m$^2$/g, 100 m$^2$/g, 150 m$^2$/g, 200 m$^2$/g, 250 m$^2$/g, 500 m$^2$/g, 1000 m$^2$/g, etc.). However, the cathode catalyst can have a low specific surface area (e.g., <10 m$^2$/g), different specific surface area for different surfaces it is disposed on (e.g., a high specific surface area on an electrode and a low specific surface area on walls or surfaces defining the cathode flow path or catholyte reaction region, a low specific surface area on an electrode and a high specific surface area on walls or surfaces defining the catholyte flow path, a higher specific surface area on an electrode than on walls or surfaces defining the catholyte flow path, a lower specific surface area on an electrode than on walls or surfaces defining the catholyte flow path, etc.), and/or can have any suitable specific surface area.

The catalyst can form a coating (e.g., conformal coating, bumpy coating, porous coating, etc.), can include particles (e.g., nanoparticles such as nanospheres, nanorods, nanotubes, nanostars, nanoshells, nanopolyhedra, etc.; mesoparticles; microparticles; etc. such as hollow particles, porous particles, solid particles, etc.) that can be deposited on a surface, and/or can have any suitable structure (e.g., engineered structure).

In some variants, catalyst can be disposed on (e.g., deposited on) surfaces of the catholyte flow path (e.g., in addition to or as an alternative to coating or being the electrode). For instance, the distribution plate 235 can be made of the catalyst, the distribution plate can include structures made from the catalyst the define the catholyte flow path, walls or surfaces defining the catholyte flow path 230 can include catalyst, and/or the catalyst can otherwise be disposed on surfaces of the catholyte flow path.

The catholyte reaction region 230 (e.g., catholyte flow path) can be analogous to any anolyte reaction region as described above. For instance, the catholyte reaction region can be the same as and/or different from the anolyte reaction region. The catholyte reaction region is preferably a mirror image of the anolyte reaction region (e.g., mirror image across the membrane). However, the catholyte reaction region and anolyte reaction region can otherwise be related (e.g., preferably, but not necessarily, in a manner that results in a closed system where anolyte, oxidized anolyte, catholyte, and reduced catholyte are retained within the electrolyzer).

In some variants, the catholyte reaction region can be configured to promote (e.g., form, maintain, generate, etc.) a uniform flow of catholyte (e.g., catholyte velocity varies by less than about 25%, 20%, 15%, 10%, 5%, 1%, 0.5%, 0.1%, etc. throughout the catholyte reaction region) within the catholyte reaction region. For instance, the catholyte reaction region can generate a uniform flow by maintaining a cross-sectional shape (e.g., a cylindrical path, circular cross-section, elliptical cross-section, hemispherical cross-section, etc.) and/or cross-sectional size (e.g., greatest size variance through cross-sectional cuts orthogonal to the catholytre reaction region varies by less than 30%, <20%, <15%, <10%, <7.5%, <5%<<2%, <1%, etc.) throughout the catholyte reaction region. However, a uniform flow can otherwise be maintained (e.g., based on a pump pressure used to introduce catholyte into the catholyte reaction region, based on a back-pressure from the reduced catholyte, based on a wetability of surfaces defining the catholyte reaction region, etc.).

In some variants, the catholyte inlet 232 can include a plurality of inlets, which can be beneficial for controlling an oxidized anolyte concentration (e.g., sulfuric acid concentration) by controlling an amount of water present at different locations throughout the catholyte reaction region and/or anolyte reaction region. As an example, the distribution plate (or portions thereof containing, adjacent to, etc. the catholyte reaction region) can be porous or fluid permeable to enable water to enter the catholyte reaction region from any location. However, the plurality of catholyte inlets can be arranged in any manner.

The reduced catholyte (e.g., at the catholyte outlet 238, within a reservoir downstream of the catholyte reaction region, etc.) is preferably maintained at a pressure greater than an anolyte pressure. Having this pressure differential can be beneficial for hindering and/or reducing crossover of the anolyte across the membrane. As an illustrative example, a hydrogen pressure can be (and/or can exceed the anolyte introduction pressure by) 10 bar, 15 bar, 20 bar, 25 bar, 30 bar, 40 bar, 50 bar, 100 bar, values or ranges therebetween, and/or any suitable pressure. However, the hydrogen pressure can be about 1 bar (e.g., 0.9-1.1 bar, 0.8-1 bar, 1-1.05 bar, etc.), 2 bar, 3 bar, 5 bar, less than 1 bar, and/or can be any suitable pressure. The hydrogen pressure can be achieved by the electrolyzer, using a compressor (e.g., downstream of the electrolyzer), and/or can be achieved in any manner.

The separator 300 (e.g., membrane) preferably functions to shuttle ions (e.g., protons) and/or molecules (e.g., solvent molecules such as water) between the anode and the cathode while hindering (e.g., preventing) the anolyte, catholyte, oxidized anolyte products, reduced catholyte products, and/or other species (e.g., electrons, electricity, etc.) from crossing the separator and/or electrically insulating the anode and cathode (from one another). The separator is preferably arranged between the anolyte reaction region and the catholyte reaction region. However, the separator can be arranged in any suitable manner (e.g., a plurality of separators can be used). The separator can be made from fluoropolymers (e.g., nafion, fumapem, etc.), polybenzimidazole (PBI) membranes (e.g., doped with phosphoric acid, sulfuric acid, etc.), silicon carbide (e.g., saturated with phosphoric acid, sulfuric acid, etc.), aromatic polymers (e.g., PEEK), protic ionic liquids, protic ionic plastic crystals, ionomers (e.g., perfluorosulfonic acid (PFSA), PFSA-silica composites, etc.), and/or using any suitable separator. Variants that use PBI and/or PFSA-silica composites can provide a technical advantage as they enable high concentrations of sulfuric acid (e.g., concentrations exceeding about 30%, 40%, 50%, etc. where the percent can refer to a weight percent, volume percent, stoichiometric percent, etc.) without drying out and/or reducing electrical conductivity (as compared to nafion membranes which dry out at high sulfuric acid concentrations).

The separator thickness is typically between about 10 μm and 500 μm (e.g., to optimize for selectivity in hindering anolyte or catholyte crossover and electrical conductivity). However, the separator can be thinner than 10 μm or thicker than 500 μm.

In some variants, the separator can be saturated with a proton source (e.g., acid such as sulfuric acid, phosphoric acid, etc.) which can result in enhanced ionic conductivity.

An ionic conductivity (e.g., conductivity to permit flow of protons, hydrogen ions, hydrogen cations, sulfate anions, etc.) of the separator is preferably at least about 0.1 S/cm (e.g., 0.2, 0.5, 0.8, 1, 1.2, 1.5, 2, 2.5, 3, 5, values or ranges therebetween, etc.). However, the separator can have any suitable ionic conductivity. The ionic transport can be ballistic, diffusive, driven (e.g., via a pump), and/or can have any suitable ion transport mechanism.

In some variants, the electrolyzer can be designed to operate in a plurality of modes. Examples of operation modes can include sulfur dioxide electrolysis mode (e.g., to oxidize sulfur dioxide to sulfuric acid and reduce water or protons therein to hydrogen), a recovery mode (e.g., a maintenance mode such as functional to improve a performance of the electrolysis mode such as by removing deposits from the anode and/or cathode), and/or the electrolyzer can operate in any suitable mode(s) (e.g., start-up mode such as to initiate a burst of electrolysis; a shut-down mode such as when electricity is not available; a water electrolysis mode such as where water is oxidized at the anode to form oxygen and water is reduced at the cathode to produce hydrogen; etc.). For example, a recovery mode can be used to oxidize reduced sulfur species (e.g., sulfur, hydrogen sulfide, etc.) that are deposited on, occupying active sites of, and/or otherwise decreasing an efficacy of the electrolyzer (particularly but not exclusively within the catholyte reaction region). The recovery mode is preferably a transient mode (e.g., lasts for less than a threshold amount of time such as 1 min, 5 min, 10 min, 20 min, 30 min, 60 min, 120 min, 240 min, 300 min, 8 hours, 12 hours, 24 hours, etc.). However, the recovery mode can be a continuous mode, and/or have any suitable duration. The electrolysis mode is preferably a continuous mode (e.g., default mode, operates absent cause to switch mode, etc.). However, the electrolysis mode can be transient (e.g., based on cyclic or acyclic changes to electricity sources) and/or have any suitable duration. The operation (e.g., switchable operation) of the electrolyzer within a recovery mode can enable electrolyzer designs that do not include a separator and/or enable wider selection of separator materials (e.g., enable the use of porous separator).

During the recovery mode, for example, oxidizing agents (e.g., oxygen, hydrogen peroxide, ozone, nitrates, etc.) and/or sulfur oxidizing microbes can be introduced into the electrolyzer to oxidize the reduced sulfur species (e.g., to sulfur dioxide which can be recovered and oxidized during the electrolysis mode, to sulfur trioxide, etc.). However, the electrolyzer can operate in any suitable mode(s).

The operation mode can be controlled based on materials introduced to the electrolyzer (e.g., introducing new material, removing access to a material, etc.), based on a connection to a power supply, material concentration (e.g., by increasing a concentration of oxygen dissolved in water during a recovery mode), by changing an electrical potential (e.g., changing a cathode voltage such that sulfur and/or hydrogen sulfide is oxidized), by changing a current density, by changing an electrode, by changing a concentration of the anolyte or catholyte, by changing a solvent, and/or can otherwise be controlled. Typically, switching between the different operation modes results in changes to the catholyte (e.g., introduction of additional or alternative species in the catholyte) and/or reagents (e.g., without changing the anode reaction, anode reagents, anode products, etc.). For instance, during the electrolysis mode water can be used as the catholyte and during the recovery mode oxygen can be added in the catholyte (in addition to or alternative to water). However, additionally or alternatively, switching between the different operation modes can result in changes to the anolyte and/or can otherwise be enabled (e.g., by changing an operating current density, operating voltage, operating pressure, etc.).

The operation mode can depend on a current density provided to perform the electrolysis (e.g., when the current density decreases below a threshold current the mode can switch from an electrolysis mode to a recovery mode), an overpotential (e.g., when an overpotential exceeds a threshold overpotential the mode can switch from the electrolysis mode to the recovery mode), an operation time (e.g., amount of time since the recovery mode was performed, a maintenance schedule or operation timetable, etc.), detection of reduced sulfur species (particularly by not exclusively in the catholyte reduction region), the cost of available electricity (e.g., when the cost is greater than a threshold cost the operation mode can switch to the recovery mode), based on a value of coproducts (e.g., hydrogen value, sulfuric acid value, hydrogen demand, sulfuric acid demand, etc. such as when demand for one or both of the coproducts is less than a threshold demand the mode can switch to a recovery mode), based on a source of electricity (e.g., when green energy sources provide less than a threshold amount of electricity the mode can switch to a recovery mode), based on an upstream or downstream process (e.g., when an upstream process requires additional reagents the mode can switch to ensure sufficient reagent production, when a downstream process is not able to provide sufficient reagents the mode can switch to reduce a reagent use or to recover the catalyst(s), etc.), combinations of the above conditions, and/or can otherwise be selected. The electrolyzer can automatically switch between modes (e.g., based on one or more sensor measurements as processed by a computing system connected to the electrolyzer, based on received data, etc.), manually switch between modes (e.g., based on input from a user or operator), and/or can otherwise switch between modes.

Typically, the electrolyzer operates at a current density of at least 1 A/cm² (e.g., 1.1 A/cm², 1.2 A/cm², 1.5 A/cm², 2 A/cm², 5 A/cm², 10 A/cm², etc.). However, the electrolyzer can operate at any suitable current density. The typical current density can be the threshold current density, a fraction of (e.g., 95%, 90%, 85%, 80%, 75%, 50%, etc.) the typical current density can be the threshold current density, and/or any suitable typical current density can be used.

In some variants, a plurality of electrolyzers (e.g., electrolyzer cells) can be stacked (e.g., arranged in parallel or series). Each electrolyzer can be operated in the same or different modes. As an illustrative example, a first electrolyzer can generate concentrated sulfuric acid (e.g., by operating at a first set of operating parameters) and a second electrolyzer can generate dilute sulfuric acid (e.g., by oxidizing sulfur dioxide that was not oxidized by the first electrolyzer). In a second illustrative example, a plurality of electrolyzers can be operated in parallel. When a current density for an electrolyzer of the plurality changes by a threshold amount or relative to a threshold value, that electrolyzer can be switched to a recovery mode such as by reducing sulfur dioxide provided to said electrolyzer, by increasing an oxidizing agent concentration, by changing an electrical property (e.g., current density, electrical potential, etc.), and/or by otherwise switching said electrolyzer to the recovery mode.

5. Method

As shown for example in FIG. 2, a method can include: processing precursors S100, electrochemically oxidizing sulfur dioxide S200, processing products from the electrochemical oxidation of sulfur dioxide S300, and/or any suitable steps. The method preferably functions to form two (or more) valuable coproducts (e.g., molecules, materials, heat, electricity, energy, chemicals, etc.) leveraging electrochemical oxidation of sulfur dioxide. However, the method can alternatively function. In a specific example, the method can be performed using a combination of one or more furnaces (e.g., operable to heat one or more substances to a temperature between about 100-1500° C. or any temperature or temperature range contained therein in air, in an oxidizing environment such as an oxygen enriched atmosphere, in a reducing environment, etc.) an electrolyzer (e.g., an electrolyzer as described above), and a reaction vessel (e.g., bomb calorimeter, pressure container, pressurized furnace, etc.) However, the method can additionally or alternatively be performed by any suitable component(s).

The method can be performed continuously and/or intermittently (e.g., only when green electricity such as solar, wind, tide, etc. is available). All or portions of the method can be performed in iteratively, contemporaneously, simultaneously (e.g., concurrently), asynchronously, periodically, and/or at any other suitable time. All or portions of the method can be performed automatically, manually, semi-automatically, and/or otherwise performed. The method (e.g., each step thereof) is preferably performed in a single location (e.g., single manufacturing site, single geographic region). However, one or more products, byproducts, materials, and/or other product can be transported to a different location to perform the method (e.g., S100, S200, and S300 can be performed in different locations).

Processing precursors S100 can function to prepare one or more precursor materials for S200 and/or S300. Examples of precursors that can be used include: sulfur (e.g., disulfur, trisulfur, tetrasulfur, cyclo-(penta; hexa; octa; nona; deca; undeca; dodeca; trideca; tetradeca; pentadeca; octadeca; eicosa; etc.)sulfur, fibrous sulfur, lamina sulfur, amorphous sulfur, insoluble sulfur, φ-sulfur, ω-sulfur, λ-sulfur, μ-sulfur, π-sulfur, etc.), hydrogen sulfide (e.g., $H_2S$; pure hydrogen sulfide; impurity hydrogen sulfide in other materials such as sour gas, sour petroleum, sour crude oil, etc.; etc.), sulfur ores (e.g., acanthite $Ag_2S$, chalcocite $Cu_2S$, bornite $Cu_5FeS_4$, galena $PbS$, sphalerite $ZnS$, chalcopyrite $CuFeS_2$, pyrrhotite $Fe_{1-x}S$, millerite $NiS$, pentlandite $(Fe,Ni)_9S_8$, covellite $CuS$, cinnabar $HgS$, realgar $AsS$, orpiment $As_2S_3$, stibnite $Sb_2S_3$, pyrite $FeS_2$, marcasite $FeS_2$, molybenite $MoS_2$, cobaltite $(Co,Fe)AsS$, arsenopyrite $FeAsS$, Gerdorffite $NiAsS$, pyrargyrite $Ag_3SbS_3$, proustite $Ag_3AsS_3$, tetrahedrite $Cu_{12}Sb_4S_{13}$, tennantite $Cu_{12}As_4S_{13}$, enargite $Cu_3AsS_4$, bournonite $PbCuSbS_3$, jamesonite $Pb_4FeSb_6S_{14}$, cylindrite $Pb_3Sn_4FeSb_2S_{14}$, etc.), metal sulfides (e.g., transition metal sulfides, alkali metal sulfides, post-transition metal sulfides, etc.), and/or any suitable precursor(s) can be used.

The precursors can be processed at room temperature, at an elevated temperature (e.g., a temperature >20° C., >30° C., >50° C., >75° C., >100° C., >120° C., >140° C., >200° C., >500° C., >750° C., >1000° C., etc.), and/or at any suitable temperature.

Processing precursors can include metallurgical processing, washing, sulfur oxidation, and/or any suitable steps or processes.

In variants that include metallurgical processing, the metallurgical processing can function to purify, refine, separate, and/or otherwise process ores and/or metals. Examples of metallurgical processes that can be performed in (particularly in S100) can include: extractive metallurgy (e.g., mineral processing such as comminution, sizing, concentration, gravity concentration, electrostatic separation, magnetic separation, dewatering, etc.; hydrometallurgy such as leaching, solution concentration and/or purification, metal or metal compound recovery, etc.; pyrometallurgy such as calcining, roasting, smelting, refining, etc.; electrometallurgy such as electrolysis, electrowinning, electrorefining, electroplating, electroforming, electropolishing, etching, etc.; ionometallurgy; metalworking processes such as casting, forging, rolling, extrusion, machining, sintering, fabrication, etc.; etc.).

Roasting the precursors preferably functions to convert sulfur compounds (e.g., sulfur allotropes, sulfur ores, sulfur-containing molecules, sulfides, metal sulfides, etc.) into sulfur dioxide (e.g., by converting the remaining elements from the material into oxides, substituting sulfur for oxygen within the precursor, etc.). Examples of roasting process parameters include: temperature, inlet gas composition (e.g., carrier gas identity, oxygen concentration, relative humidity, etc.), time, pressure, catalyst(s) (e.g., catalyst material, presence or absence of catalyst, etc.), and/or any suitable roasting process parameters can be tuned or used. Processing parameters of the roasting are preferably selected to essentially only form sulfur dioxide (e.g., selectively form greater than about 90% $SO_2$, less than 10% $SO_3$, etc.). However, roasting process parameters can otherwise be selected. For instance, pyrite (or other sulfur ores) can be roasted at a temperature between about 600-1000° C. in air to produce sulfur dioxide.

In a specific example, roasting the precursors can include oxycombusting sulfur (e.g., oxidizing elemental sulfur using oxygen such as with air, an oxygen enriched environment, etc.) and/or hydrogen sulfide (e.g., oxidizing dihydrogen sulfide using oxygen such as with air, an oxygen enriched environment, etc.).

Some variations of roasting the precursors can include performing (and/or leveraging) an air separation process, which can function to generate oxygen concentrated gas (e.g., to be used in the roasting process such as with an oxygen content between 25% and 100%), nitrogen concentrated gas (which can be used as a carrier gas, used in a Haber Bosch process, etc. such as with a nitrogen content between 80% and 100%), and/or any suitable fluid (e.g., argon). For instance, cryogenic air separation, membrane air separation, pressure swing adsorption, vacuum pressure swing adsorption, and/or any suitable air separation process can be used to generate a concentrated fluid (e.g., oxygen concentrated gas, nitrogen concentrated gas, etc.). The oxygen concentrated gas can have a composition that is greater than about 25% (e.g., % w/w, % w/v, % v/w, % v/v, etc.) $O_2$ (e.g., 30%, 35%, 40%, 50%, 60%, 75%, 80%, 85%, 90%, 95%, 97.5%, 99%, 99.9%, 99.95%, 99.99%, 99.995%, 99.999%, etc.) where the remainder can be residual gases from air (e.g., nitrogen, carbon dioxide, argon, neon, etc.). The nitrogen concentrated gas can have a composition that is greater than about 75% (e.g., % w/w, % w/v, % v/w, % v/v, etc.) $N_2$ (e.g., 77.5a %, 80%, 85%, 90%, 95%, 97.5%, 99%, 99.9%, 99.95%, 99.99%, 99.995%, 99.999%, etc.) where the remainder can be residual gases from air (e.g., oxygen, carbon dioxide, argon, neon, etc.). The inclusion of an air separation process can be particularly beneficial for achieving a target sulfur dioxide concentration feed into the electrolyzer (e.g., by removing inert or nonutilized carrier gases before they can be introduced into the electrolyzer) and can also offer synergies as some applications can leverage the remaining fluids for other processes (e.g., leveraging nitrogen enriched fluid for ammonia generation).

In variants the include desulfurization, desulfurization can function to generate or form sulfur dioxide from mercaptans (e.g., thiols, thiophenes, organic sulfides, organic disulfides, etc.) and/or hydrogen sulfide (e.g., contaminant, impurity, undesirable, etc. sulfurous compounds in sour gas, sour petroleum, etc.; high purity sulfur-containing compounds; waste material from other processes; etc.). For instance, hydrodesulfurization can be performed by hydrogenation of mercaptans (e.g., reacting $H_2$ with mercaptans) to form hydrocarbons or other organic molecules and hydrogen sulfide, which can then be separated. The hydrogen sulfide can then be oxidized (e.g., to form sulfur dioxide), used in a Claus plant (e.g., performing the Claus process to form elemental sulfur), and/or can otherwise be processed. Desulfurization can be particularly beneficial when performed downstream of outlets from the catholyte (e.g., to separate and/or remove hydrogen sulfide from hydrogen, to recycle hydrogen sulfide present in the hydrogen within the electrolyzer, etc.). For instance, a scrubber and/or other cleanup or decontamination module can be included before, within, and/or after a hydrogen reservoir where the scrubber and/or other cleanup or decontamination module can function to capture, separate, recover, and/or otherwise isolate hydrogen sulfide from the hydrogen.

Washing the precursors can function to decrease (e.g., remove) one or more impurities (e.g., heavy metals, actinides, lanthanides, selenides, tellurides, oxides, nitrides, halides, etc.) from the precursors (or products resulting from the processing such as metal oxides). Washing can include mechanical washing (e.g., scrubbing), chemical washing (e.g., using solvents, using acids, using bases, using chelating agents, etc.), physical washing, and/or any suitable steps and/or processes.

In some variants, nonchemical outputs (e.g., heat, electricity, pressure, flow, etc.) from preprocessing steps can be leveraged by downstream processes (e.g., in variants where the steps of the method are performed in a common location). As an illustrative example, heat generated during preprocessing (e.g., during sulfur combustion, etc.) can be used to provide heat for electrochemical oxidation of sulfur dioxide (S200) and/or for processing products of the electrochemical reduction of the sulfur oxidation (e.g., S300 such as for concentrating sulfuric acid, ammonia formation, phosphoric acid formation, etc.).

Electrochemically oxidizing sulfur dioxide S200 functions to reduce water to hydrogen concomitantly with the formation of sulfur trioxide and/or sulfuric acid from oxidation of sulfur dioxide. S200 is preferably performed in an electrolyzer (e.g., an electrolyzer as described above). However, S200 can be performed using any suitable component (s).

Typically, S200 requires input energy (e.g., electricity, heat, etc.) to operate. As an illustrative example, when sulfur dioxide oxidation to sulfuric acid is coupled with water hydrolysis to hydrogen, an electrical potential of at least 0.17 V can be required (and often an overpotential on the order of hundreds of mV such as 100 mV, 200 mV, 300 mV, 500 mV, 700 mV, etc. is applied). For example, A current density during S200 is preferably at least about 1 A/cm$^2$ (e.g., 0.95 A/cm$^2$, 1.1 A/cm$^2$, 1.2 A/cm$^2$, 1.5 A/cm$^2$, 2 A/cm$^2$, etc.). However, any suitable current density can be used.

The sulfur dioxide oxidation is preferably performed at elevated temperatures (e.g., temperatures above room temperature such as 50° C., 60° C., 70° C., 80° C., 90° C., 100° C., 120° C., 150° C., 180° C., 200° C., 225° C., 250° C., 300° C., 350° C., 374° C., values or ranges therebetween, etc.).

A differential pressure (e.g., between inlet anolyte and outlet reduced catholyte, between sulfur dioxide and hydrogen, between inlet anolyte and inlet catholyte, between sulfur dioxide and water, etc.) is preferably greater than about 20 Bar (e.g., 20 Bar, 22 Bar, 25 Bar, 30 Bar, 35 Bar, 40 Bar, 50 Bar, 100 Bar, etc.). However, the differential pressure can have any suitable value. To achieve the differential pressure, the anolyte pressure can be fixed; the catholyte pressure can be fixed; the reduced catholyte pressure can be fixed; the anolyte, catholyte, and/or reduced catholyte pressures can vary (e.g., in a concerted manner to maintain a target differential pressure); the anolyte, catholyte, and/or reduced catholyte can be pressurized; and/or the differential pressure can otherwise be achieved. As a first illustrative example, a sulfur dioxide pressure can be about 1 Bar and a Hydrogen partial pressure can be about 30 Bar (resulting in a differential pressure of about 30 Bar). As a second illustrative example, at 80° C. sulfur dioxide's boiling point is about 19 Bar and a Hydrogen partial pressure can be maintained at about 50 Bar (to result in a differential pressure of about 30 Bar). In a variation of the second illustrative example, the Hydrogen partial pressure can be maintained at about 30 Bar (resulting in a differential pressure of about 10 Bar).

The operation parameters (e.g., current density, electrical potential, amount of overpotential, temperature, pressure, differential pressure between inlet anolyte and outlet catholyte, differential pressure between inlet anolyte and inlet catholyte, etc.) can be limited by material compatibility (e.g., separator compatibility, separator conductivity, etc.), electrolyzer wall compatibility (e.g., resistance of, rate of reaction of, etc. an electrolyzer material to reaction with sulfuric acid at the electrolysis temperature), and/or by any suitable temperature limiting component. For instance, when a nafion separator is used, the electrolysis temperature may be limited to at most about 80° C. as the separator becomes desiccated resulting in insufficient electrical and/or ionic conductivity. However, the sulfur dioxide oxidation can be performed in any suitable conditions.

In some variants, S200 can additionally (or alternatively) include performing a contact process to generate sulfur trioxide and/or sulfuric acid from sulfur dioxide. The inclusion of the contact process can be particularly advantageous when insufficient heat is generated within the method to sustain each step of the method. However, the contact process can additionally or alternatively improve an overall efficiency of sulfur dioxide conversion (e.g., by performing the contact process using unreacted sulfur dioxide that remains after the electrolyzer) and/or can otherwise function and/or be beneficial. However, the contact process can additionally or alternatively be performed using sulfur dioxide directly from S100 (e.g., where a portion of the sulfur dioxide is used for electrochemical oxidation of sulfur dioxide with reduction of water and a second portion is treated using the contact process such as to achieve a target sulfuric acid to hydrogen ratio, to generate a target amount of heat, etc.) and/or using any suitable sulfur dioxide.

S200 is preferably performed without recycling sulfuric acid into sulfur dioxide (i.e., sulfuric acid is not use catalytically, S200 is performed as a feedthrough process, etc.). However, sulfuric acid can be reduced to sulfur dioxide (e.g., for catalytic or cyclic performance of S200; for instance when excess sulfuric acid is generated relative to hydrogen, to maintain a target sulfur dioxide concentration or pressure, when insufficient sulfur dioxide is generated in S100, etc.). In an illustrative example, less than about 5% of sulfuric acid generated in S200 can be reduced to sulfur dioxide and reintroduced into the electrolyzer (via the anolyte inlet).

Processing products from the electrochemical oxidation of sulfur dioxide S300 can function to use sulfuric acid (and/or other oxidized anolyte) and/or hydrogen (and/or other reduced catholyte) from S200. S300 can include the same and/or different processes from those performed on precursors as in S100. The sulfuric acid and hydrogen preferably cooperatively interact within the processing (e.g., the sulfuric acid and hydrogen are preferably both used in the processing step such as within the same reaction, to produce two products that are then reacted together, enhance a reaction rate for each other, as shown for example in FIG. 9 or FIG. 10, etc.). However, the sulfuric acid and hydrogen can be used in separated processing steps (e.g., where products from the processing steps are not necessarily combined in further processes).

Variants of S300 can include: purifying one or more species S310, concentrating one or more species S320, reducing one or more species S330, oxidizing one or more species S340, dissolving one or more species S350, complexing one or more species S360, and/or any suitable steps.

Purifying one or more species S310 can function to decrease an impurity concentration within the sulfuric acid and/or hydrogen from S200. Examples of impurities that can be removed from sulfuric acid can include unoxidized sulfur dioxide, carrier gas (e.g., air, nitrogen, oxygen, argon, etc.), and/or other impurities can be removed from the sulfuric acid. Examples of impurities that can be removed from hydrogen include water, hydrogen sulfide, and/or other impurities can be removed from the hydrogen. The impurities can be removed using adsorption, absorption, phase changes (e.g., converting the impurities into a different phase from the material to be purified and physically separating the impurities and the material to be captured), using differential solubilities in different solvent systems, distillation, and/or in any suitable manner.

The recovered impurities are preferably reused (e.g., recycled) in the method. As a first example, unoxidized sulfur dioxide can be fed back into the electrolyzer (e.g., in S200). As a second example, hydrogen sulfide can be introduced into a furnace to undergo oxycombustion (e.g., in S100). As a third example, recovered carrier gases can be reused as carrier gas. However, the recovered impurities do not have to be reused (e.g., can be disposed of, can be used for other processes, etc.).

Concentrating one or more species S320 functions to increase a concentration of sulfuric acid and/or hydrogen (e.g., from S200, from S310, etc.). S320 is typically performed after S310 (e.g., purified sulfuric acid and/or hydrogen is concentrated), but can be performed before and/or during S310. The species can be concentrated via evaporation (e.g., evaporating solvent such as water while retaining the species), distillation, and/or in any suitable manner. In a specific example, the concentration of sulfuric acid generated in S200 can be increased from between 20-50% up to 30 to 95% (e.g., % w/w, % v/v, % w/v, % v/w, etc.) by evaporating water from the sulfuric acid solution. In variations of this example (as shown for example in FIG. 9), heat from the oxycombustion of sulfur (e.g., in S100) can be leveraged for the water evaporation (e.g., without requiring additional energy input for sources outside of the method).

Reducing one or more species S330 preferably functions to reduce a species using hydrogen (e.g., from S200, from S310, from S320, etc.). S330 is typically performed after S320; however, S330 can be performed before S320, during S320, without performing S320 (e.g., without concentrating the hydrogen), without performing S310 (e.g., without purifying the hydrogen), and/or performed with any suitable timing and/or other processes. Examples of species to be reduced include metal oxides (e.g., nickel laterite, nickel oxide, iron oxide, etc.), nitrogen, and/or any suitable species can be reduced. For instance, nitrogen gas (e.g., nitrogen concentrated gas from S100) can be reduced using hydrogen via a Haber Bosch process to generate ammonia. Similarly, metal oxides can be reduced using hydrogen. However, the species can be reduced in any suitable manner.

In variations of S330, heat from the oxycombustion of sulfur (e.g., in S100, combustion of sulfur with oxygen) can be leveraged for the reduction reaction (e.g., without requiring additional energy input for sources outside of the method).

Oxidizing one or more species S340 can function to oxidize a species using sulfuric acid (e.g., from S200, from S310, from S320, etc.). 340 is typically performed after S320; however, S330 can be performed before S320, during S320, without performing S320 (e.g., without concentrating the hydrogen), without performing S310 (e.g., without purifying the hydrogen), and/or performed with any suitable timing and/or other processes. For instance, metals (such as copper) can be oxidized using concentrated sulfuric acid. Note that sulfur dioxide that is generated during the oxidation process can be recycled into the electrolyzer (e.g., in S200) to form further sulfuric acid. Heat generated in S340 can be used in any manner as discussed for heat used from S100 processes (e.g., to facilitate reactions or processes within the method and minimizing an amount of external input energy required).

Dissolving one or more species S350 functions to increase a solubility of species (e.g., metal ions) and/or suspend species in solution. Basic species (e.g., lewis bases, Brøn- sted bases, etc.) are typically dissolved using sulfuric acid, while acidic species (e.g., Lewis acids, Brønsted acids, etc.) may be dissolved using hydrogen. Dissolving one or more species can includes performing a double substitution reaction, a single substitution reaction, and/or any suitable reaction. For example, metal oxides (e.g., nickel laterite, nickel oxide, etc.), metal phosphates (e.g., phosphate ores such as magnesium phosphate, calcium phosphate, etc.), and/or other suitable species can be dissolved using sulfuric acid. In this example, the metal cations can be dissolved in the solution, can form metal sulfates (which may dissolve in water or other solvent), and/or can otherwise be formed concomitantly with the formation of water. In variations of this example that use phosphates, phosphoric acid (and/or phosphate salts related thereto) can be formed. However, any suitable species can be formed during dissolution of the one or more species.

In some variations (as shown for example in FIG. 10), sulfur (e.g., elemental sulfur, hydrogen sulfide, used as a precursor in S100, etc.) can be used to separate dissolved metals (e.g., based on differential solubility of metal sulfides). The resulting metal sulfides can then be oxycombusted (e.g., in S100) to generate sulfur dioxide (with the advantage of also facilitating the separation of one or more valuable metal such as nickel from other impurity metals such as iron).

Complexing one or more species S36o can function to generate a complex that can be used for separation, for applications (e.g., as a fertilizer), for storage, for transportation, and/or can otherwise be used. The species used to form the complex are typically derived from (directly or indirectly) or directly include the hydrogen and the sulfuric acid (e.g., from S200, S310, S320, etc.). However, the species can be derived from any suitable source(s). As a first illustrative example, ammonia (e.g., from S330) can react with phosphoric acid (e.g., from S350) to generate an ammonium phosphate (e.g., $(NH_4)_3PO_4$, $(NH_4)_2HPO_4$, $(NH_4)H_2PO_4$, metal salts of $(NH_4)_2PO_4^-$, metal salts of $(NH_4)PO_4^{2-}$, combinations thereof, etc., where metal salts typically but do not necessarily have a biologically beneficial metal cation such as sodium, potassium, magnesium, calcium, aluminium, zinc, nickel, molybdenum, copper, manganese, iron, chromium, cobalt, etc.) which can be used as a phosphate fertilizer. As a second illustrative example, ammonia (e.g., from S330) can react with sulfuric acid (e.g., from S200, S310, S320, etc.) to generate an ammonium sulfate (e.g., $(NH_4)_2SO_4$, $(NH_4)HSO_4$, metal salts of $(NH_4)SO_4^-$, combinations thereof, etc. where metal salts typically but do not necessarily have a biologically beneficial metal cation such as sodium, potassium, magnesium, calcium, aluminium, zinc, nickel, molybdenum, copper, manganese, iron, chromium, cobalt, etc.) which can be used as a sulfate fertilizer. In a third illustrative example, ammonia can react with reduced (e.g., from S330) or solubilized (e.g., from S350) metal ions to form metal ammonia complexes. These metal ammonia complexes can be used to separate two or more metals from one another (e.g., to separate nickel from iron or other metal ions present in nickel laterite).

However, processing the sulfuric acid and/or hydrogen can include any suitable steps and/or processes.

In a first illustrative example, a method can include combusting sulfur or hydrogen sulfide with oxygen (e.g., oxycombusting) at a temperature greater than about 140° C. in an oxygen enriched atmosphere to produce sulfur dioxide and heat; in an electrolyzer, oxidizing the sulfur dioxide to sulfuric acid and reducing water to hydrogen, where a concentration of the sulfur dioxide is between 10%-95% (e.g., 30%, 50%, 75%, 95%, etc.), at an electrolysis temperature between about 70-90° C.; separating the sulfuric acid from unoxidized sulfur dioxide; after separating the unoxidized sulfur dioxide from the sulfuric acid, concentrating the sulfuric acid from less than 50% (e.g., % w/w, % v/v, % v/w, % w/v, etc.) to at least 75% (e.g., 80%, 85%, 90%, 95%, 97%, 99%, etc.) using the heat from the oxycombustion; converting nitrogen to ammonia using the hydrogen and the heat from the oxycombustion; extracting phosphoric acid from phosphate ore using the sulfuric acid; and forming at least one of monoammonium phosphate, diammonium phosphate, or triammonium phosphate from the ammonia and the phosphoric acid. In variations of the first illustrative example, at least 25% (e.g., 30%, 40%, 50%, 70%, 80%, 90%, 95%, 97%, 99%, 99.5%, 99.9%, etc.) of the sulfur dioxide is converted to sulfuric acid within a pass of the electrolyzer. In variations of the first illustrative example sulfur is generated from hydrogen sulfide using the Claus process. Variations of the first illustrative example can include forming at least one of ammonium sulfate or diammonium sulphate from the ammonia and the sulfuric acid. Variations of the first illustrative example can include forming the oxygen enriched environment from air, wherein the nitrogen comprises air remaining after separating the oxygen. In variations of the first illustrative example, none of the sulfuric acid is recycled to sulfur dioxide and reintroduced into the electrolyzer. In variations of the first illustrative example, the unoxidized sulfur dioxide is fed into the electrolyzer. In variations of the illustrative example, the unoxidized sulfur dioxide is converted to sulfuric acid via a contact process, wherein water from concentrating the sulfuric acid is consumed in the contact process.

In a second illustrative example, a method can include: in an electrolyzer, oxidizing sulfur dioxide to sulfuric acid and reducing water to hydrogen; concentrating the sulfuric acid to a concentration greater than about 50%; reducing a first species with the hydrogen to form a reduced first species; and extracting a second species with the sulfuric acid; wherein the reduced first species and the second species cooperatively interact, and wherein less than 5% of the sulfuric acid is reduced to the sulfur dioxide. In variations of second illustrative example, the first species can include nitrogen, the second species can include phosphoric acid, and the ammonia (reduced first species) and the phosphoric acid can cooperatively interact to form at least one of monoammonium phosphate, diammonium phosphate, or triammonium phosphate. In variations of the second illustrative example, the ammonia can further cooperatively interact with the sulfuric acid to form at least one of monoammonium sulfate or diammonium sulfate. In variations of the second illustrative example, the first species comprises nitrogen, wherein the second species comprises dissolved metal ions wherein the ammonia and the dissolved metal ions cooperatively interact to extract nickel (from nickel laterite ore, from other metals present in ore, etc.). In variations of the second illustrative example, the first species can include nickel oxide and the second species can include nickel laterite (e.g., with a mixture of other transition metals), where sulfuric acid can be used to separate the nickel from other transition metals and hydrogen can be used to reduce nickel oxide (and/or other transition metal oxides) to nickel (and/or the respective metal). Variations of the second specific example can include combusting at least one of sulfur or hydrogen sulfide to generate the sulfur dioxide, wherein heat generated during combusting the at least one of sulfur or hydrogen sulfide is used during reducing the first species with the hydrogen to form the reduced first species. In variations of the second illustrative example. the sulfur dioxide can have a concentration of at least 75% (e.g., % w/w, % w/v, % v/w, v/v, etc.). Variations of the second illustrative example can include removing hydrogen sulfide formed in the electrolyzer from the hydrogen, wherein the hydrogen sulfide formed in the electrolyzer is combusted to form the sulfur dioxide. Variations of the second illustrative example can include separating oxygen and nitrogen from air to generate an oxygen enriched gas and a nitrogen enriched gas, wherein the oxygen enriched gas is used during combusting the at least one of sulfur or hydrogen sulfide, and wherein the nitrogen enriched gas is reduced to form ammonia. Variations of the second illustrative example can include before concentrating the sulfuric acid, separating unoxidized sulfur dioxide from the sulfuric acid. In variations of the second illustrative example, the unoxidized sulfur dioxide can be fed into a second electrolyzer to be oxidized into sulfuric acid. In variations of the second illustrative example unoxidized sulfur dioxide can be oxidized to sulfuric acid using the contact process, wherein heat generated by the contact process is used to concentrate the sulfuric acid. In variations of the second illustrative example, approximately 0% of the sulfuric acid is reduced to the sulfur dioxide. In variations of the second illustrative example a pressure of hydrogen at an outlet from the electrolyzer is at least 25 Bar.

In a third specific example, an electrolyzer can include an anode; a cathode; a separator (e.g., with a proton conductivity greater than about 0.0 1 S/cm) between the anode and the cathode; a first inlet configured to introduce anolyte into an anolyte flow path, wherein the anolyte comprises gaseous sulfur dioxide; a second inlet configured to introduce catholyte into a catholyte flow path, wherein the catholyte comprises water; a first outlet configured to release oxidized anolyte from the anolyte flow path, wherein the oxidized anolyte comprises sulfuric acid; and a second outlet configured to release reduced catholyte from the catholyte flow path, where the reduced catholyte comprises hydrogen; where the electrolyzer is operable between: an electrolysis mode, where the anolyte is oxidized to the oxidized anolyte at the anode and the catholyte is reduced to the reduced catholyte at the cathode when the electrolyzer receives electricity in the electrolysis mode; and a recovery mode, where an oxidizing agent is introduced into the catholyte flow path, wherein the oxidizing agent oxidizes sulfur deposited on the cathode to sulfur dioxide. In variations of the third specific example the oxidizing agent can include (e.g., be one of, be exactly one of, be a combination of, etc.) at least one of oxygen, hydrogen peroxide, potassium permanganate, or ozone. In variations of the third specific example, the electrolyzer can include a plurality of first inlets configured to introduce the anolyte into the anolyte flow path at a plurality of points along the anolyte flow path. In variations of the third specific example, the electrolyzer cam be configured to switch from the electrolysis mode to the recovery mode when a current density is less than a threshold current density. In variations of the third specific example, the separator can include at least one of nafion, PBI, or PFSA-Si. In variations of the third specific example, a pressure of the hydrogen at the second outlet is at least 30 Bar.

In a fourth specific example, an electrolyzer can include an anode; a cathode; a separator (e.g., with a proton conductivity greater than about 0.01 S/cm) between the anode and the cathode; a plurality of anolyte inlets configured to introduce anolyte into an anolyte flow path at a plurality of locations, wherein the anolyte flow path is coated with anode catalyst, wherein the anolyte comprises gaseous sulfur dioxide; a second inlet configured to introduce catholyte into a catholyte flow path, wherein the catholyte comprises water, wherein the water from the catholyte from the catholyte flow path passes through the separator into the anolyte flow path; a first outlet configured to release oxidized anolyte from the anolyte flow path, wherein the oxidized anolyte comprises sulfuric acid; and a second outlet configured to release reduced catholyte from the catholyte flow path, wherein the reduced catholyte comprises hydrogen, wherein a back pressure of hydrogen at the second outlet is greater than about 25 Bar. In variations of the fourth specific example, the electrolyzer can operate between: an electrolysis mode, wherein the anolyte is oxidized to the oxidized anolyte at the anode and the catholyte is reduced to the reduced catholyte at the cathode when the electrolyzer receives electricity in the electrolysis mode; and a recovery mode, wherein an oxidizing agent is introduced into the catholyte flow path, wherein the oxidizing agent oxidizes sulfur deposited on the cathode to sulfur dioxide. In variations of the fourth specific example, the oxidizing agent can include at least one of oxygen, hydrogen peroxide, potassium permanganate, or ozone. In variations of the fourth specific example, the electrolyzer can be configured to switch from the electrolysis mode to the recovery mode when a current density is less than a threshold current density. In variations of the fourth specific example, the separator can include at least one of nafion, PBI, or PFSA-Si. In variations of the fourth specific example, a relative humidity of the gaseous sulfur dioxide is about 30%. In variations of the fourth specific example, the second inlet can include a porous flow plate. In variations of the further specific example, the porous flow plate can be configured provide a uniform flow of the water.

In a fifth specific example, an electrolyzer can include an anode; a cathode; a separator (e.g., with a proton conductivity greater than about 0.01 S/cm) between the anode and the cathode; an anolyte inlet configured to introduce anolyte into an anolyte flow path, wherein the anolyte comprises gaseous sulfur dioxide with a relative humidity that is between 0-100% (e.g., 25-50%); a porous flow plate configured to uniformly introduce catholyte into a catholyte flow path, wherein the catholyte comprises water, wherein the water from the catholyte flow path passes through the membrane into the anolyte flow path; an anolyte outlet configured to release oxidized anolyte from the anolyte flow path, wherein the oxidized anolyte comprises sulfuric acid; and a catholyte outlet configured to release reduced catholyte from the catholyte flow path, wherein the reduced catholyte comprises hydrogen. In variations of the fifth specific example, a back pressure of hydrogen at the catholyte outlet can be greater than about 25 Bar. In variations of the fifth specific example, the anolyte inlet can include a plurality of entrances to the anolyte flow path, wherein anolyte is introduced to the anolyte flow path through the plurality of entrances. In variations of the fifth specific example, the separator can include PBI or PFSA-silica. In variations of the fifth specific example, the electrolyzer can operate between: an electrolysis mode, wherein the anolyte is oxidized to the oxidized anolyte at the anode and the catholyte is reduced to the reduced catholyte at the cathode when the electrolyzer receives electricity in the electrolysis mode; and a recovery mode, wherein an oxidizing agent is introduced into the catholyte flow path, wherein the oxidizing agent oxidizes sulfur deposited on the cathode to sulfur dioxide. In variations of the fifth specific example, the electrolyzer can be configured to switch from the electrolysis mode to the recovery mode when a current density is less than a threshold current density.

Alternative embodiments implement the above methods and/or processing modules in non-transitory computer-readable media, storing computer-readable instructions that, when executed by a processing system, cause the processing system to perform the method(s) discussed herein (e.g., by operating an electrolyzer, by operating a manufacturing plant or portions thereof, etc.). The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, and/or FPGA/ASIC. However, the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the preceding system and/or method can be used with, in addition to, in lieu of, or otherwise integrated with all or a portion of the systems and/or methods disclosed in the applications mentioned above, each of which are incorporated in their entirety by this reference.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30% of a reference), or be otherwise interpreted.

As a person skilled in the art will recognize from the previous detailed description and from the figures and claims, modifications and changes can be made to the preferred embodiments of the invention without departing from the scope of this invention defined in the following claims.

We claim:

1. A method comprising:
   combustion of sulfur with oxygen at a temperature greater than about 140° C. in an oxygen enriched atmosphere to produce sulfur dioxide and heat;
   in an electrolyzer, oxidizing the sulfur dioxide to sulfuric acid and reducing water to hydrogen, wherein a conversion of the sulfur dioxide is at least 50%, wherein an electrolysis temperature is between 70-90° C.;
   separation of the sulfuric acid from unoxidized sulfur dioxide;
   after separating the unoxidized sulfur dioxide from the sulfuric acid, concentrating the sulfuric acid from less than 50% to at least 85% using the heat;
   converting nitrogen to ammonia using the hydrogen and the heat;
   extracting phosphoric acid from phosphate ore using the sulfuric acid; and
   forming at least one of monoammonium phosphate, diammonium phosphate, or triammonium phosphate from the ammonia and the phosphoric acid.

2. The method of claim 1, wherein the sulfur is generated from hydrogen sulfide using the Claus process.

3. The method of claim 1, further comprising forming at least one of ammonium sulfate or diammonium sulphate from the ammonia and the sulfuric acid.

4. The method of claim 1, wherein the oxygen enriched environment is formed by separating oxygen from air, wherein the nitrogen comprises air remaining after separating the oxygen.

5. The method of claim 1, wherein none of the sulfuric acid is recycled to sulfur dioxide and reintroduced into the electrolyzer.

6. The method of claim 1, wherein the unoxidized sulfur dioxide is fed into the electrolyzer.

7. The method of claim 1, wherein the unoxidized sulfur dioxide is converted to sulfuric acid via a contact process, wherein water from concentrating the sulfuric acid is consumed in the contact process.

8. A method comprising:
   in an electrolyzer, oxidizing sulfur dioxide to sulfuric acid and reducing water to hydrogen;
   concentrating the sulfuric acid to a concentration greater than about 50% w/w;
   reducing a first species with the hydrogen to form a reduced first species; and
   extracting a second species with the sulfuric acid;
   wherein the reduced first species and the second species cooperatively interact, and wherein less than 5% of the sulfuric acid is reduced to the sulfur dioxide.

9. The method of claim 8, wherein the first species comprises nitrogen, wherein the second species comprises phosphoric acid, and wherein the reduced first species and the seconds species cooperatively interact to form at least one of monoammonium phosphate, diammonium phosphate, or triammonium phosphate.

10. The method of claim 9, wherein the reduced first species further cooperatively interacts with the sulfuric acid to form at least one of monoammonium sulfate or diammonium sulfate.

11. The method of claim 8, wherein the first species comprises nickel oxide, wherein the second species comprises nickel laterite ore, wherein the reduced first species and the second species cooperatively interact to extract nickel.

12. The method of claim 8, further comprising combusting at least one of sulfur or hydrogen sulfide to generate the sulfur dioxide, wherein heat generated during combusting the at least one of sulfur or hydrogen sulfide is used during reducing the first species with the hydrogen to form the reduced first species.

13. The method of claim 12, wherein the sulfur dioxide comprises a concentration of at least 75% v/v.

14. The method of claim 13, further comprising removing hydrogen sulfide formed in the electrolyzer from the hydrogen, wherein the hydrogen sulfide formed in the electrolyzer is combusted to form sulfur dioxide.

15. The method of claim 12 further comprising, separating oxygen and nitrogen from air to generate an oxygen enriched gas and a nitrogen enriched gas, wherein the oxygen enriched gas is used during combusting the at least one of sulfur or hydrogen sulfide, and wherein the nitrogen enriched gas is reduced to form ammonia.

16. The method of claim 8 further comprising, before concentrating the sulfuric acid, separating unoxidized sulfur dioxide from the sulfuric acid.

17. The method of claim 16, wherein the unoxidized sulfur dioxide is fed into a second electrolyzer to be oxidized into sulfuric acid.

18. The method of claim 16, wherein the unoxidized sulfur dioxide is oxidized to sulfuric acid using the contact process, wherein heat generated by the contact process is used to concentrate the sulfuric acid.

19. The method of claim 8, wherein approximately 0% of the sulfuric acid is reduced to the sulfur dioxide.

20. The method of claim 8, wherein a pressure of hydrogen at an outlet from the electrolyzer is at least 25 Bar.

\* \* \* \* \*